(12) United States Patent
Nakamoto

(10) Patent No.: US 8,849,890 B2
(45) Date of Patent: Sep. 30, 2014

(54) DISTRIBUTION APPARATUS, DISTRIBUTION METHOD, AND COMPUTER-READABLE MEDIUM

(75) Inventor: Hisashi Nakamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 971 days.

(21) Appl. No.: 12/512,228

(22) Filed: Jul. 30, 2009

(65) Prior Publication Data

US 2010/0036904 A1 Feb. 11, 2010

(30) Foreign Application Priority Data

Aug. 7, 2008 (JP) .................................. 2008-204641

(51) Int. Cl.
*G06F 15/16* (2006.01)
*G06F 11/07* (2006.01)
*G06F 3/12* (2006.01)

(52) U.S. Cl.
CPC ........ *G06F 11/0733* (2013.01); *G06F 11/0769* (2013.01); *G06F 3/1294* (2013.01)
USPC ........................... 709/202; 709/229; 714/47.1

(58) Field of Classification Search
CPC  G06F 11/0733; G06F 11/0769; G06F 3/1294
USPC ........................................................ 709/202
See application file for complete search history.

(56) References Cited

U.S. PATENT DOCUMENTS

| | | | |
|---|---|---|---|
| 2002/0019948 A1* | 2/2002 | Katou et al. ................... 713/202 |
| 2003/0200058 A1* | 10/2003 | Ogawa et al. ................. 702/184 |
| 2004/0255261 A1* | 12/2004 | Kanno ........................... 717/100 |
| 2006/0026306 A1* | 2/2006 | Kasamatsu ..................... 710/10 |
| 2006/0111984 A1* | 5/2006 | Tokita et al. ..................... 705/26 |
| 2006/0274794 A1* | 12/2006 | Watanabe et al. ........... 372/29.02 |
| 2007/0067681 A1* | 3/2007 | Hikawa et al. ................... 714/47 |
| 2007/0179751 A1* | 8/2007 | Karasawa ...................... 702/188 |
| 2009/0077055 A1* | 3/2009 | Dillon et al. ....................... 707/5 |

FOREIGN PATENT DOCUMENTS

| | | | |
|---|---|---|---|
| CN | 1196706 A | * | 10/1998 |
| EP | 1377024 A2 | * | 1/2004 |
| JP | 2004-310192 A | | 11/2004 |
| JP | 2005-184472 A | | 7/2005 |

OTHER PUBLICATIONS

Google Patent Search.*
Google Scholar Search.*

* cited by examiner

*Primary Examiner* — Arvin Eskandarnia
(74) *Attorney, Agent, or Firm* — Canon U.S.A., Inc. IP Division

(57) ABSTRACT

A distribution apparatus includes a detection unit configured to detect a work required for a device based on information received from the device. A first distribution unit is configured to distribute image data for a display of information relating to the required work detected by the detection unit to the device. A determination unit is configured to determine whether the device has shifted its operation into a maintenance state, based on information received from the device to which the first distribution unit has distributed the image data. A second distribution unit is configured to distribute a subsequent part of the image data that follows a part having been displayed immediately before the device shifts its operation into the maintenance state, if the determination unit determines that the device has shifted its operation into the maintenance state, to a terminal apparatus of a worker who performs the work.

10 Claims, 16 Drawing Sheets

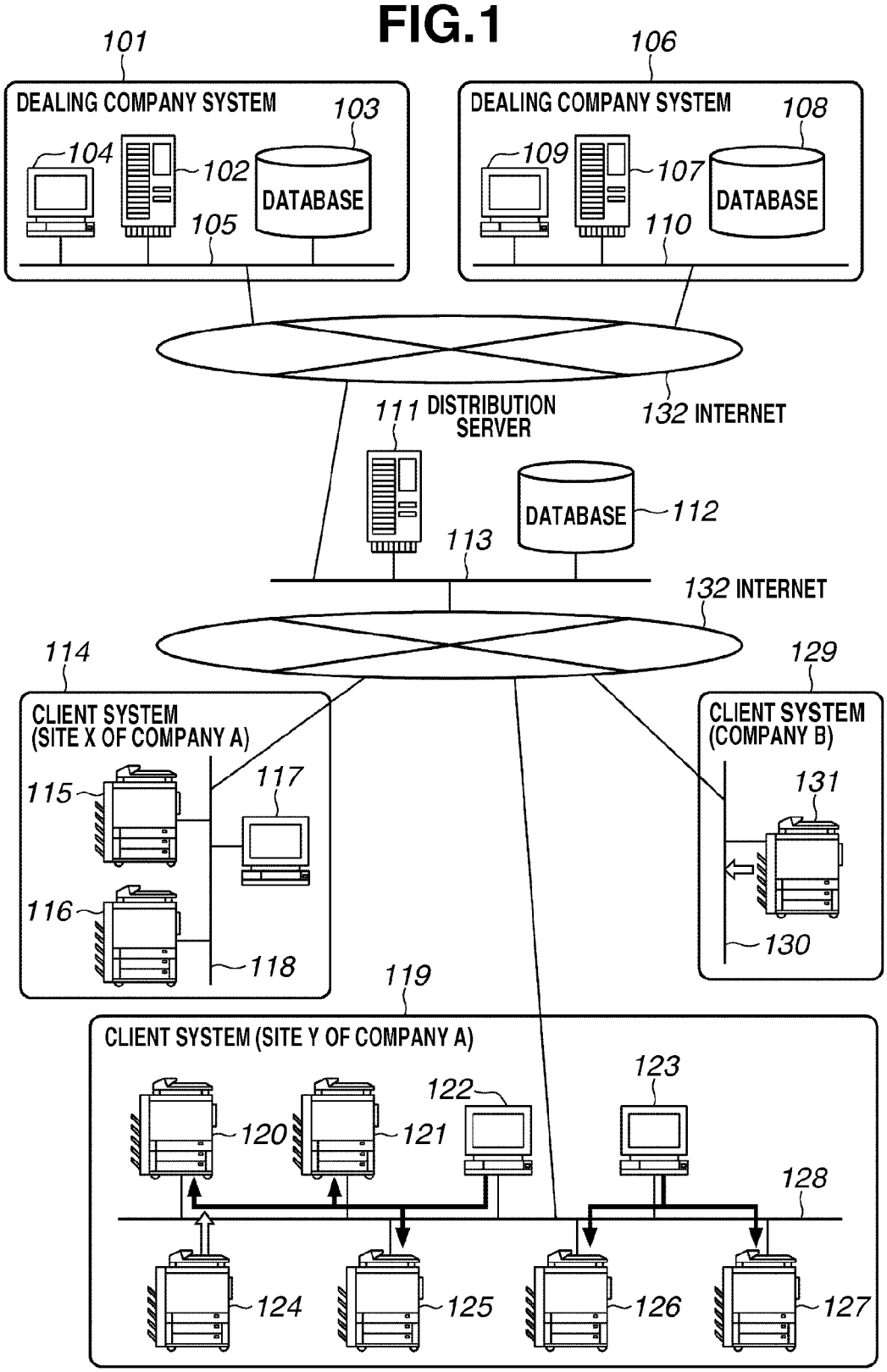

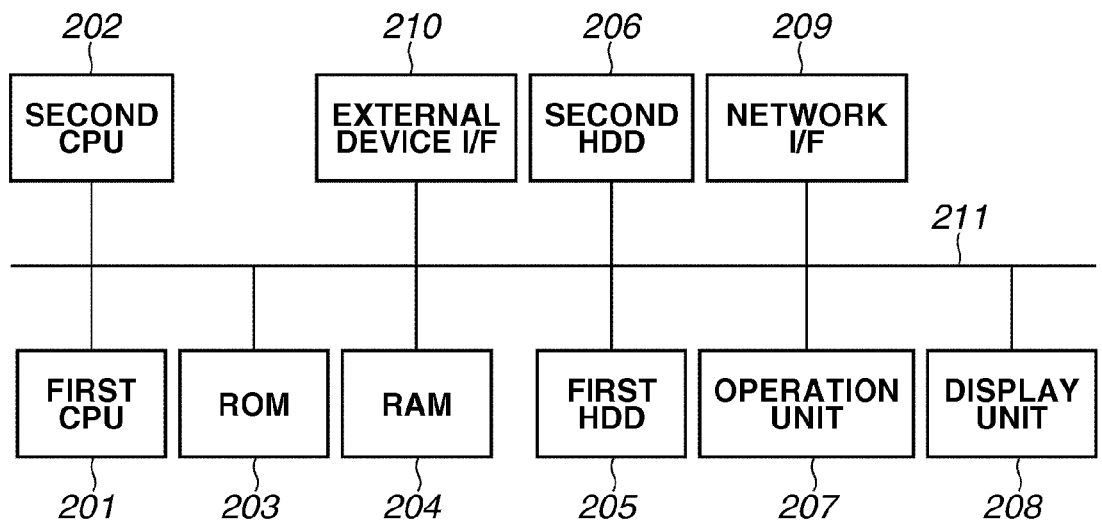
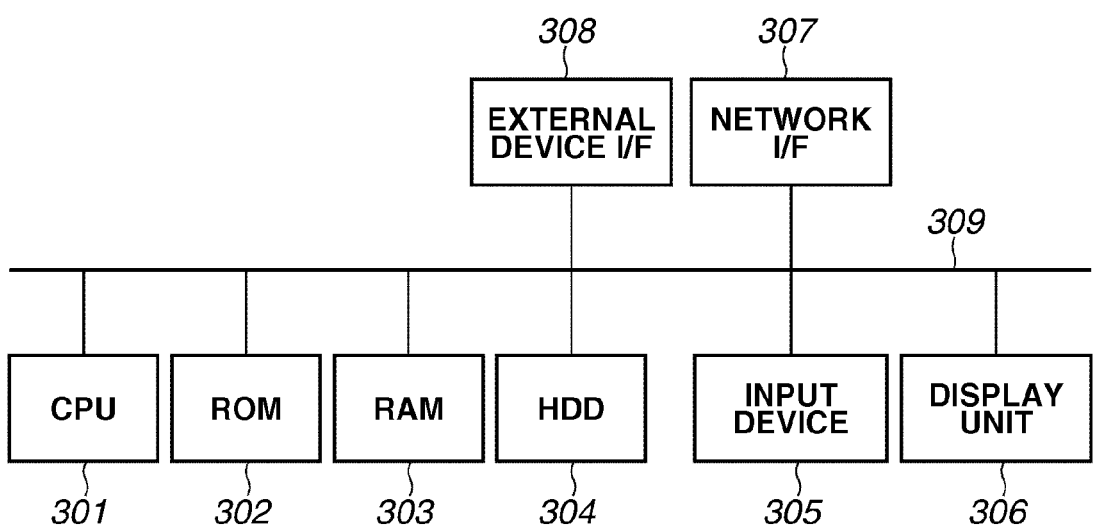

| <VERSION> | <1/4> | <READY> |

(1) IS PRINT IMAGE "THIN"?

(2) DOES PRINT IMAGE CONTAIN "SCRATCH"?

(3) DOES PRINT IMAGE CONTAIN "DISPLACEMENT/ DEFOCUS/FLOW"?

| SELECT (1) | SELECT (2) | SELECT (3) |

← → UPDATE ☐

| <VERSION> | <1/4> | <READY> |

(1) IS DOCUMENT POSITIONING GLASS DISTORTED?

(2) DOES MACHINE NEED TO BE CLEANED?

(3) DO YOU REQUIRE SERVICE ENGINEER TO BE DISPATCHED?

| SELECT (1) | SELECT (2) | SELECT (3) |

← → UPDATE ☐

FIG.18

| | |
|---|---|
| ALARM CODE | ALARM CODE INCLUDES ABNORMAL DATA TO BE TRANSMITTED FROM IMAGE FORMING APPARATUS. THERE ARE THREE ALARM LEVELS 1, 2, AND 3. LEVEL 1 IS IGNORABLE, LEVEL 2 REQUIRES CONDITIONAL DETERMINATION (SIMILAR TO JAM NOTIFICATION), AND LEVEL 3 IS IMMEDIATELY NOTIFIED TO DISTRIBUTION SERVER<br><br>INFORMATION TO BE NOTIFIED IS AS FOLLOWS:<br><br>LEVEL 1: LOWER-LEVEL ABNORMALITY<br>· CPU COOLING FAN ABNORMALITY<br>· SOFT COUNTER SUBSTRATE  NORMAL WRITING UNEXECUTABLE<br>· SOFT COUNTER SUBSTRATE  DATA UNRESTORABLE<br>LEVEL 2: ABNORMALITY/FAILURE<br>· DOCUMENT POSITIONING GLASS UNCLEANNESS DISPLAY<br>· STAPLE ABSENCE<br>· CASSETTE RETRY ALARM<br>LEVEL 3: SERVICE CALL REQUIRING ERROR OR EQUIVALENT ABNORMALITY/FAILURE<br>· SHEET FEEDING SENSOR LIGHT QUANTITY INSUFFICIENCY ALARM<br>· PHOTO MEMORY OVERFLOW<br>· RENDERING ERROR (ECI MODULE) |
| ERROR CODE | INFORMATION TO BE NOTIFIED IS AS FOLLOWS:<br>· ANALOG PRINTER ABNORMALITY  FIXING DEVICE RELATED<br>  IN A CASE WHERE FIXING TEMPERATURE IS ABNORMALLY HIGH DUE TO MALFUNCTION OF THERMISTER OR SSR<br>· ANALOG PRINTER ABNORMALITY  COUNTER RELEVANT<br>  IN A CASE WHERE TOTAL COUNTER IS FAILED<br>· ANALOG PRINTER ABNORMALITY  TWO-SIDED UNIT RELATED<br>  IN A CASE WHERE DRIVING OF TRANSPORTATION ROLLER OF TWO-SIDED UNIT IS ABNORMAL |
| JAM CODE | JAM CODE INDICATES OCCURRENCE OF JAM STATE.<br><br>· JAM TYPE IS DEPENDENT ON EACH SHEET FEEDING PORTION.<br>  MANUAL FEEDING TRANSPORTATION SENSOR JAM, RIGHT DECK SHEET FEEDING SENSOR DWELLING JAM, ETC. |

DISTRIBUTION APPARATUS, DISTRIBUTION METHOD, AND COMPUTER-READABLE MEDIUM

BACKGROUND OF THE INVENTION

1. Field of the Invention

The present invention relates to a distribution apparatus, a distribution method, and a computer program.

2. Description of the Related Art

Conventionally, a monitoring system is proposed to monitor an operation state of a peripheral apparatus (e.g., an image forming apparatus). A distribution server is also proposed to distribute the firmware to image forming apparatuses.

If an image forming apparatus fails in an environment of the monitoring system, the system detects the failure based on failure information (e.g., an error code, an alarm code, and a jam code) transmitted from the image forming apparatus and dispatches a service engineer to the location (i.e., setup place) of the image forming apparatus.

According to another conventional technique, a distribution server can distribute a maintenance-use moving image to an image forming apparatus so that a service engineer can browse the distributed image during a maintenance work for the apparatus. As discussed in Japanese Patent Application Laid-Open No. 2004-310192, there is a conventional system that determines whether a failure of an image forming apparatus is serious or not and, if the failure is not serious, distributes a moving image required for a repair work to the failed device, thereby preventing a service engineer from being dispatched unnecessarily.

Further, there is a conventional distribution server that divides the content of a moving image into a plurality of portions and distributes each divided portion of the image to a terminal. For example, as discussed in Japanese Patent Application Laid-Open No. 2005-184472, for the purpose of reducing the load of a server or a network, a terminal is allowed to download a partial content of the moving image beforehand and can acquire the rest of the entire content instantaneously from the server when the terminal displays the moving image.

As described above, in a case where a failure occurs in an image forming apparatus located on the client side, it is desired that the distribution server distributes a maintenance-use moving image (or a help-use moving image) to the failed image forming apparatus to enable a user of the client side to fix the failed portion of the apparatus.

However, when such a moving image is distributed, a worker is required to wait and stay at a place adjacent to an operation panel of the image forming apparatus where the worker can browse the moving image. Moreover, even when the distributed moving image is displayed on the operation panel of the image forming apparatus, the worker may not be able to view the image displayed on the operation panel during a maintenance (or restoration) work if the scale of the image forming apparatus is huge and the portion to be repaired is far from the operation panel.

If a worker turns off a power source of an image forming apparatus for a repair work, the worker cannot view the moving image to be displayed on the operation panel.

According to the above-described conventional techniques, a worker may have substantially no chance to view a moving image that instructs a work to be performed for a device (e.g., an image forming apparatus).

SUMMARY OF THE INVENTION

Exemplary embodiments of the present invention are directed to a technique capable of overcoming or at least mitigating the above-described problems.

Exemplary embodiments of the present invention are directed to a technique capable of surely displaying, for a worker, an image instructing a work to be performed on a device.

According to an aspect of the present invention, at least one exemplary embodiment is directed to a distribution apparatus which includes a detection unit configured to detect a work required for a device based on information received from the device, a first distribution unit configured to distribute image data for a display of information relating to the required work detected by the detection unit to the device, a determination unit configured to determine whether the device has shifted its operation into a maintenance state based on information received from the device to which the first distribution unit has distributed the image data, and a second distribution unit configured to distribute a subsequent part of the image data that follows a part having been displayed immediately before the device shifts its operation into the maintenance state, if the determination unit determines that the device has shifted its operation into the maintenance state, to a terminal apparatus of a worker who performs the work.

According to the exemplary embodiments of the present invention, if it is determined that a device has shifted its operation into a maintenance state, a subsequent part of the image data having been displayed immediately before the device shifts its operation into the maintenance state can be distributed to a terminal of the worker. Therefore, the exemplary embodiments of the present invention can surely display, for a worker, an image instructing a work to be performed on the device.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 1 illustrates an example of an overall configuration of a distribution server system according to an exemplary embodiment of the present invention.

FIG. 2 illustrates an example of a hardware configuration of a distribution server according to an exemplary embodiment of the present invention.

FIG. 3 illustrates a first example of a hardware configuration of a monitoring apparatus according to an exemplary embodiment of the present invention.

FIGS. 17A and 17B illustrate examples of failure content inquiry-use moving images according to an exemplary embodiment of the present invention.

FIG. 18 illustrates examples of an error code, an alarm code, and a jam code according to an exemplary embodiment of the present invention.

DETAILED DESCRIPTION OF THE EMBODIMENTS

Figure 4:
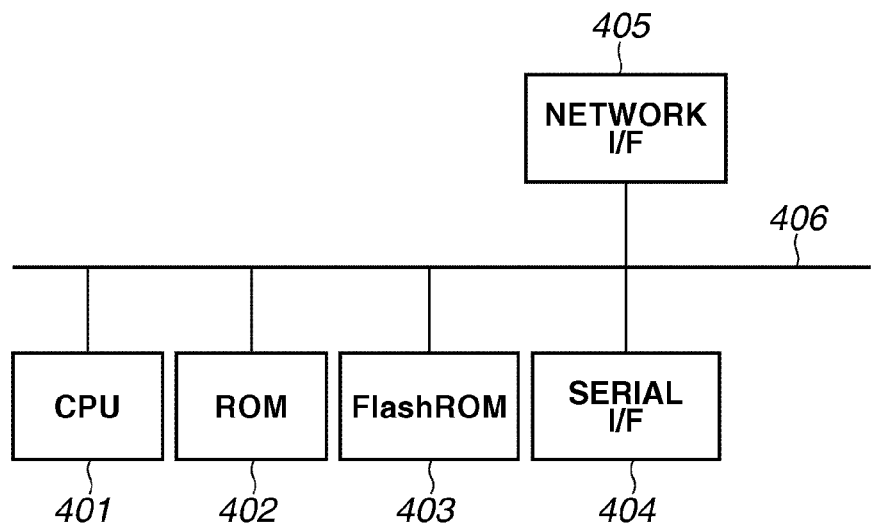
FIG. 4 illustrates a second example of the hardware configuration of the monitoring apparatus according to an exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Various exemplary embodiments, features, and aspects of the invention will be described in detail below with reference to the drawings.

FIG. 1 illustrates an example of an overall configuration of a distribution server system. The distribution server system illustrated in FIG. 1 includes a plurality of dealing company systems 101 and 106.

The dealing company systems 101 and 106 include databases 103 and 108 that store information relating to regions controlled by each dealing company, as well as client's sales information, and information relating to a monitoring system. The dealing company systems 101 and 106 further include personal computers (PCs) 104 and 109 that perform control for registration and correction of data stored in the databases 103 and 108. The PCs 104 and 109 enable users to access a web site provided by a distribution server 111 and browse data on their display units.

The dealing company systems 101 and 106 further include host computers 102 and 107 that can transmit registration information to the distribution server 111 and can receive information from the distribution server 111. The host computer 102, the database 103, and the PC 104 are mutually connected via a local area network (i.e., LAN) 105. The host computer 107, the database 108, and the PC 109 are mutually connected via a LAN 110.

If the host computers 102 and 107 can perform the roles of the PCs 104 and 109, respectively, if they have an operation unit and a display unit. According to the example illustrated in FIG. 1, each of the dealing company systems 101 and 106 includes a plurality of apparatuses. However, if below-described functions of the present exemplary embodiment can be realized, the dealing company systems 101 and 106 may have a configuration different from that illustrated in FIG. 1. For example, the databases 103 and 108 may be configured as physical components provided in the host computers 102 and 107, respectively. The databases 103 and 108 can be provided at any place which the host computers 102 and 107 can access via Internet 132. Each of the dealing company systems 101 and 106 can be configured as a system including a plurality of apparatuses or can be configured by a single apparatus.

The distribution server 111 is located between the dealing company side (i.e., dealing company systems 101 and 106) and the client side (i.e., client systems 114, 119, and 129). The database 112 includes a history storage unit that can store information relating to monitoring of image forming apparatuses and counter values of the image forming apparatuses collected from the client side, as well as failure history information and failure pattern tables. The database 112 further stores "firmware, application, and software license information" that can be applied to the image forming apparatuses.

The distribution server 111 and the database 112 are mutually connected via a LAN 113. The LAN 113 is connectable to the Internet 132. The database 112 may be a physical component provided in the distribution server 111. The database 112 may be located at another place if the distribution server 111 can access the database 112 via the Internet 132.

The distribution server 111 can collect information of monitoring targets (i.e., image forming apparatuses) and information indicating an operation state of each image forming apparatus (including failure information) from the monitoring apparatuses 117, 122, and 123 and an image forming apparatus 131. The distribution server 111 can store and process the collected information and can output warning to an external device. For example, the distribution server 111 distributes warning information to the host computers 102 and 107 in the dealing company systems 101 and 106.

For example, information indicating an operation state of the image forming apparatus includes shortage of toners, opening of door, exchange of drum, absence of cartridge, abnormality of cooling fan, abnormality of substrate, uncleanness of document positioning glass plate, shortage of staples, and insufficient light quantity of sheet feeding sensor. The information indicating the operation state of the image forming apparatus further includes overflow of font memory, rendering error, abnormality of fixing device, abnormality of counter, abnormality of two-sided unit, and paper jam.

In the present exemplary embodiment, the counter may be a charging counter that calculates an amount of money to be charged to each client (i.e., a charging object) or a department counter that calculates the frequency of use of an image forming apparatus for each department of a client. More specifically, the charging counter counts the number of sheets printed by an image forming apparatus. The department counter counts the number of sheets printed by each department that can be designated by the client. If a component counter is provided for a drum, the component counter counts revolutions of the drum. If a counter is provided for a scanner lamp, the counter measures an operation time (e.g., seconds) of the lamp. A counter for each sheet size may be provided to count the frequency of use of each image forming apparatus. A component counter that indicates the degree of exhaustion of a component in an image forming apparatus can be provided. The above-described information can be used as operating information.

The host computers 102 and 107 in the dealing company systems 101 and 106 can register information of monitoring targets (i.e., image forming apparatuses) and monitoring settings in the distribution server 111. The distribution server 111 can merge and integrally manage the "information of monitoring targets (i.e., image forming apparatuses) and monitoring settings" transmitted from the host computers 102 and 107. The distribution server 111 can further perform setting relating to monitoring of the monitoring apparatuses 117, 122, and 123 and the image forming apparatus 131.

The distribution server system illustrated in FIG. 1 can provide services based on the contract between a dealing company and a client. Accordingly, if the dealing company determines an image forming apparatus as a monitoring target based on the contract, the distribution server system identifies the apparatus as the monitoring target determined based on the contract.

The distribution server 111, which is connected to the PCs 104 and 109 via the Internet 132, can provide WEB pages that enable users of the PCs 104 and 109 to browse information stored in the database 112 and information derived from the stored information. In the present exemplary embodiment, the distribution server 111 provides a web page that limits the content to be browsed according to user authentication for each dealing company, each client, and each user's authority. Further, the distribution server 111 can change the information stored in the database 112 based on a WEB page change instruction from the PCs 104 and 109.

The distribution server system illustrated in FIG. 1 includes only one distribution server 111 and only one database 112. However, as an actual configuration, at least one of the distribution server 111 and the database 112 may be configured as a plurality of devices to separately collect information from image forming apparatuses and monitoring apparatuses and reduce the load to distribute the firmware.

An example configuration of a client side system is described below. There are different environments as the environment of the client side system. The distribution server system illustrated in FIG. 1 includes three client systems 114, 119, and 129.

The client system 114 (i.e., site X of company A) includes two image forming apparatuses 115 and 116 that are monitored by the monitoring apparatus 117 via a LAN 118. The monitoring apparatus 117 can communicate with the distribution server 111 via the Internet 132. The client system 119 (i.e., site Y of company A) includes six image forming apparatuses 120, 121, and 124 to 127 that are managed by two monitoring apparatuses 122 and 123 via a LAN 128.

More specifically, the monitoring apparatus 122 can manage the image forming apparatuses 120, 121, 124, and 125. The other monitoring apparatus 123 can manage the image forming apparatuses 126 and 127. The monitoring apparatuses 117, 122, and 123 are connected to a database (not illustrated). For example, the monitoring apparatus 117 stores information collected from the image forming apparatuses 115 and 116 and processed data derived from the stored data in its database (not illustrated). The monitoring apparatus 117 further stores setting data relating to monitoring of the image forming apparatuses 115 and 116 in its database (not illustrated).

The database (not illustrated) is, for example, connected to the LANs 118, 128, or 130 and operable independently. The database can be provided at any place which the monitoring apparatuses 117, 122, and 123 can access via the Internet 132. If the monitoring apparatuses 117, 122, and 123 receive state information (e.g., occurrence of failure) from respective image forming apparatuses 115 and 116, 120, 121, and 124 to 127, the monitoring apparatuses 117, 122, and 123 transmit each of the received information to the distribution server 111.

The client system 129 (company B) includes the image forming apparatus 131 connected to a LAN 130. The image forming apparatus 131 can directly communicate with the distribution server 111 via the Internet 132. The image forming apparatus 131 has operational functions comparable to those of the monitoring apparatuses 117, 122, and 123. The image forming apparatus 131 can spontaneously transmit its own state information (e.g., counter information or occurrence of failure) to the distribution server 111. The image forming apparatus 131 can access the above-described database (not illustrated) in the same manner as the monitoring apparatuses 117, 122, and 123 can do.

As illustrated in FIG. 1, respective image forming apparatuses 115 and 116, 120, 121, and 124 to 127 in the company A can communicate with the distribution server 111 via the monitoring apparatuses 117, 122, and 123. However, if their settings are changed, the image forming apparatuses in the company A can directly communicate with the distribution server 111 similar to the image forming apparatus 131 provided in the client system 129 in the company B.

The distribution server system illustrated in FIG. 1 can perform communications via the Internet 132 using the Hyper Text Transfer Protocol (i.e., HTTP) or the Simple Object Access Protocol (i.e., SOAP). The SOAP is based on the extended Markup Language (i.e., XML) and can be used to call data and services from one computer to another computer. In the present exemplary embodiment, the SOAP is implemented on the HTTP. The communication based on the SOAP exchanges SOAP messages including an XML document and additional information. Therefore, the computer that can support the SOAP includes a SOAP message generation unit configured to generate SOAP messages and a SOAP message interpretation unit configured to interpret SOAP messages. In the present exemplary embodiment, respective image forming apparatuses can use SOAP messages to transmit state information to the distribution server 111.

FIG. 2 illustrates an example of a hardware configuration of the distribution server 111. The configuration illustrated in FIG. 2 can be a hardware configuration of the host computers 102 and 107 although their descriptions are not repeated.

The distribution server 111 illustrated in FIG. 2 includes a first central processing unit (i.e., CPU) 201 and a second CPU 202 that can execute various processing to be performed by the distribution server 111. A read only memory (i.e., ROM) 203 is a non-rewritable nonvolatile memory, which can store programs and data relating to various processing to be executed by the distribution server 111 (i.e., its own device). A random access memory (i.e., RAM) 204 is a data rewritable memory, which can electrically store temporary data relating to various processing to be performed by the distribution server 111 (i.e., its own device).

The distribution server 111 further includes a first hard disk drive (i.e., HDD) 205 and a second HDD 206 that can store programs, data, and temporary data that relate to the processing of the distribution server 111 (i.e., its own device), information relating to each monitoring target (i.e., image forming apparatus), information collected from the image forming apparatuses, and information relating to each moving image (i.e., distribution target). For example, the data of the above-described various counters (e.g., the component counter, the charging counter, and the department counter) are stored in the first HDD 205 or the second HDD 206.

The distribution server 111 stores a program that executes below-described processing in the first HDD 205. The first CPU 201 or the second CPU 202 can execute the program loaded in the RAM 204 that can be used as a temporary storage area.

An operation unit 207 includes a keyboard and a pointing device that enable an operator to input instructions to the distribution server 111. A display unit 208 can display an operation status of the distribution server 111 and information output by a program executed by the distribution server 111. A network I/F 209 can transmit and receive information to and from external apparatuses via the LAN 113 (and the Internet 132). An external device I/F 210 can be connected to an external storage device. The above-described components are mutually connected via a system bus 211.

FIG. 3 illustrates a first example of a hardware configuration of the monitoring apparatuses 117, 122, and 123. The configuration illustrated in FIG. 3 can be a hardware configuration of the PCs 104 and 109 and their descriptions are not repeated.

In FIG. 3, a CPU 301 can execute various processing that can be executed by the monitoring apparatuses 117, 122, and 123. A ROM 302 is a non-rewritable nonvolatile memory, which can store programs and data relating to various processing to be executed by the monitoring apparatuses 117, 122, and 123 (i.e., its own device). A RAM 303 is a data rewritable memory, which can electrically store temporary data relating to various processing to be performed by the monitoring apparatuses 117, 122, and 123 (i.e., its own device).

An HDD 304 can store programs, data, and temporary data that relate to the processing of the monitoring apparatuses 117, 122, and 123 (i.e., its own device), information relating to each monitoring target (i.e., image forming apparatus), and information collected from the image forming apparatuses. The HDD 304, when it is installed in the PCs 104 and 109, can store a WEB browser.

An input unit 305 includes a keyboard and a pointing device that enable an operator to input instructions to the monitoring apparatuses 117, 122, and 123. A display unit 306 can display an operation status of the monitoring apparatuses 117, 122, and 123 and information output by a program executed by the monitoring apparatuses 117, 122, and 123. A network I/F 307 can transmit and receive information to and from external apparatuses via the LAN 118 or 128 (and the Internet 132). An external device I/F 308 can be connected to an external storage device. The above-described components are mutually connected via a system bus 309.

FIG. 4 illustrates a second example of the hardware configuration of the monitoring apparatuses 117, 122, and 123. In FIG. 4, a CPU 401 can execute various processing that can be executed by the monitoring apparatuses 117, 122, and 123. A ROM 402 is a non-rewritable nonvolatile memory, which can store programs and data relating to various processing to be executed by the monitoring apparatuses 117, 122, and 123 (i.e., its own device). A FlashROM 403 can store data and temporary data relate to the processing of the monitoring apparatuses 117, 122, and 123 (i.e., its own device), information relating to each monitoring target (i.e., image forming apparatus), and information collected from the image forming apparatuses. A serial I/F 404 is connectable to a terminal via a serial cable.

For example, programs executed by the monitoring apparatuses 117, 122, and 123 can output error signals or logs via a serial I/F 404. A network I/F 405 can transmit and receive information to and from external apparatuses via the LAN 118 or 128 (and the Internet 132). The above-described components are mutually connected via a system bus 406.

Figure 5:
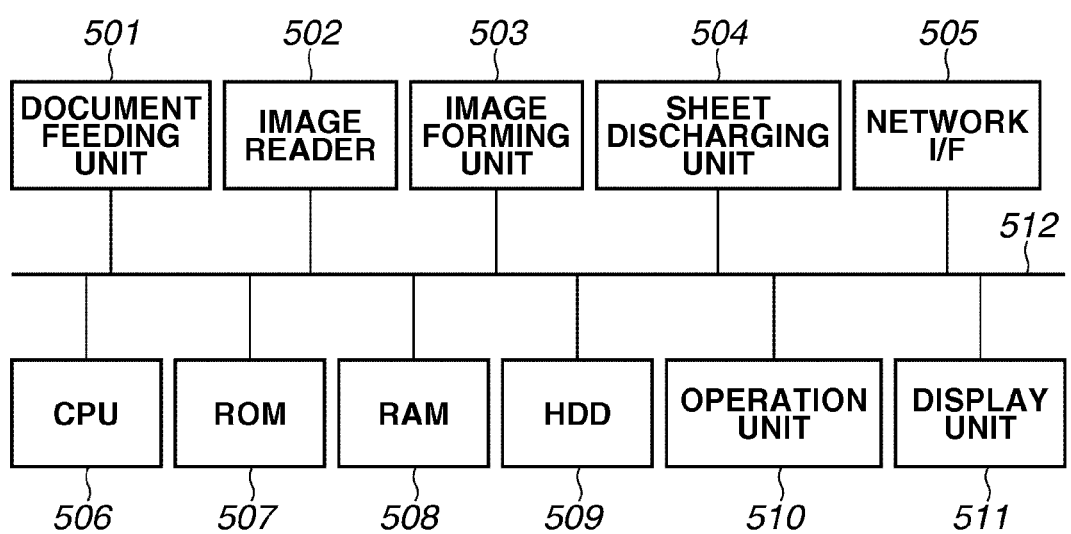
FIG. 5 illustrates an example of a hardware configuration of an image forming apparatus according to an exemplary embodiment of the present invention.

FIG. 5 illustrates an example of a hardware configuration of the image forming apparatuses 115 and 116, 120, 121, 124 to 127, and 131. The image forming apparatus is, for example, a multifunction peripheral having copy, printer, and facsimile functions. Another example of the image forming apparatus is a printer (e.g., an electrophotographic printer or an inkjet printer) that performs printing based on data received from a PC, a scanner, or a facsimile. The image forming apparatus illustrated in FIG. 5 is a multifunction peripheral.

In FIG. 5, a document feeding unit 501 can feed a document. An image reader 502 can read the document fed by the document feeding unit 501. An image forming unit 503 can convert the document read by the image reader 502, or data received from an external apparatus via the LANs 118, 128, and 130 or the Internet 132, into a print image and print the converted print image. A sheet discharging unit 504 can discharge a sheet printed by the image forming unit 503 and can perform post-processing (e.g., sorting and stapling) on the discharged sheet. A network I/F 505 can transmit and receive information to and from external apparatuses via the LAN 118, 128, or 130 (and the Internet 132). The above-described components are mutually connected via a system bus 406.

A CPU 506 controls various functions to execute the processing of the image forming apparatus. For example, the CPU 506 monitors an operation state of the image forming apparatus (i.e., its own device). If a specific event (e.g., failure) occurs, the CPU 506 instructs the network I/F 505 to transmit state information (i.e., information indicating a state of the apparatus) to a predetermined destination, such as the distribution server 111 or one of the monitoring apparatuses 117, 122, and 123.

A ROM 507 is a non-rewritable nonvolatile memory, which can store programs and data relating to various processing to be executed by the image forming apparatus (i.e., its own device). A RAM 508 is a data rewritable memory, which can electrically store temporary data relating to various processing to be performed by the image forming apparatus (i.e., its own device). An HDD 509 can store programs, data, and temporary data that relate to the processing of the image forming apparatus (i.e., its own device) and user data transmitted to the image forming apparatus (i.e., its own device).

The image forming apparatuses 115 and 116, 120, 121, 124 to 127, and 131 can store a program that executes below-described processing in the HDD 509. The CPU 506 can execute the program loaded in the RAM 508 that can be used as a temporary storage area.

An operation unit 510 enables users to input instructions to the image forming apparatus (i.e., its own device). A display unit 511 can display an operation status of the image forming apparatus (i.e., its own device) and information relating to the operations of the operation unit 510. The above-described components are mutually connected via a system bus 512 to transmit and receive various data.

As described above, the image forming apparatus 131 has the capability of spontaneously transmitting its own state information (i.e., information for monitoring the state of its own device) to the distribution server 111. Therefore, the image forming apparatus 131 can store a program and data relating to the state information transmission processing in the ROM 507 or the HDD 509.

Figure 6:
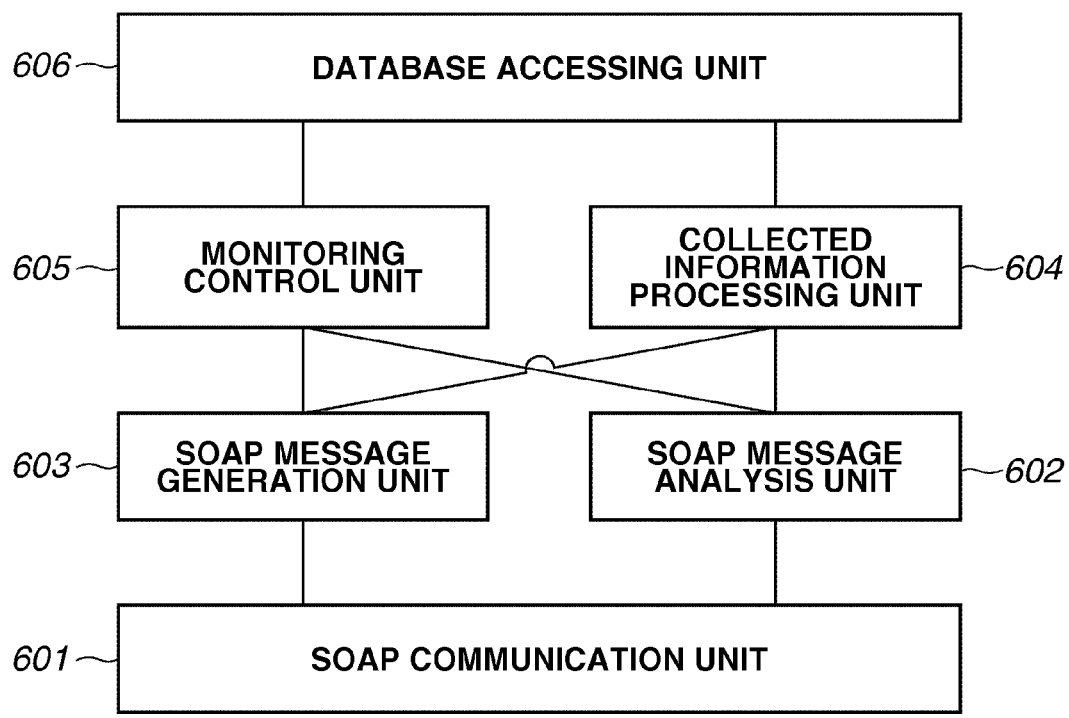
FIG. 6 illustrates an example of a software configuration of the distribution server according to an exemplary embodiment of the present invention, which relates to monitoring of the image forming apparatus.

FIG. 6 illustrates an example of a software configuration of the distribution server 111, which relates to monitoring of the image forming apparatus. In FIG. 6, a SOAP communication unit 601 can receive SOAP data from external apparatuses (e.g., the monitoring apparatuses 117, 122, and 123 and the image forming apparatus 131) and can send the received data to a SOAP message analysis unit 602 via the network I/F 209. The SOAP communication unit 601 can transmit the SOAP data generated by the SOAP message generation unit 603 via the network I/F 209 to external apparatuses (e.g., the monitoring apparatuses 117, 122, and 123 and the image forming apparatus 131).

The SOAP message analysis unit 602 can analyze the SOAP data received from the SOAP communication unit 601 and send the SOAP data to a collected information processing unit 604.

The collected information processing unit 604 can receive the SOAP data from the SOAP message analysis unit 602 (i.e., information received from the monitoring apparatuses 117, 122, and 123 and the image forming apparatus 131) and can store the received SOAP data in the database 112 via a database accessing unit 606. In this case, the collected information processing unit 604 may process or not process the SOAP data before storing the data in the database 112.

The collected information processing unit 604 can realize a function relating to a remote monitoring system. For example, the collected information processing unit 604 performs the following processing based on information received from the monitoring apparatuses 117, 122, and 123 and the image forming apparatus 131 under the monitoring of the distribution server 111 and the data stored in the database 112.

More specifically, the collected information processing unit 604 instructs the SOAP message generation unit 603 to notify a service engineer in charge or a client side administrator of a counting result of counter information, error information of the image forming apparatus, and the latest firmware information. When the SOAP message generation unit 603 receives this instruction, the SOAP message generation unit 603 can generate SOAP data based on the instruction and send the generated SOAP data to the SOAP communication unit 601.

A monitoring control unit 605 can manage a schedule for acquiring information from the monitoring apparatuses 117, 122, and 123 and the image forming apparatus 131 that are monitored by the distribution server 111. The monitoring control unit 605 can further control the content and method for monitoring the monitoring apparatuses 117, 122, and 123 and the image forming apparatus 131. The monitoring control unit 605 can send, if necessary, instructions for the monitoring apparatuses 117, 122, and 123 and the image forming apparatus 131 to the SOAP message generation unit 603. When the SOAP message generation unit 603 receives an instruction, the SOAP message generation unit 603 generates SOAP data based on the instruction and sends the generated SOAP data to the SOAP communication unit 601.

Figure 7:
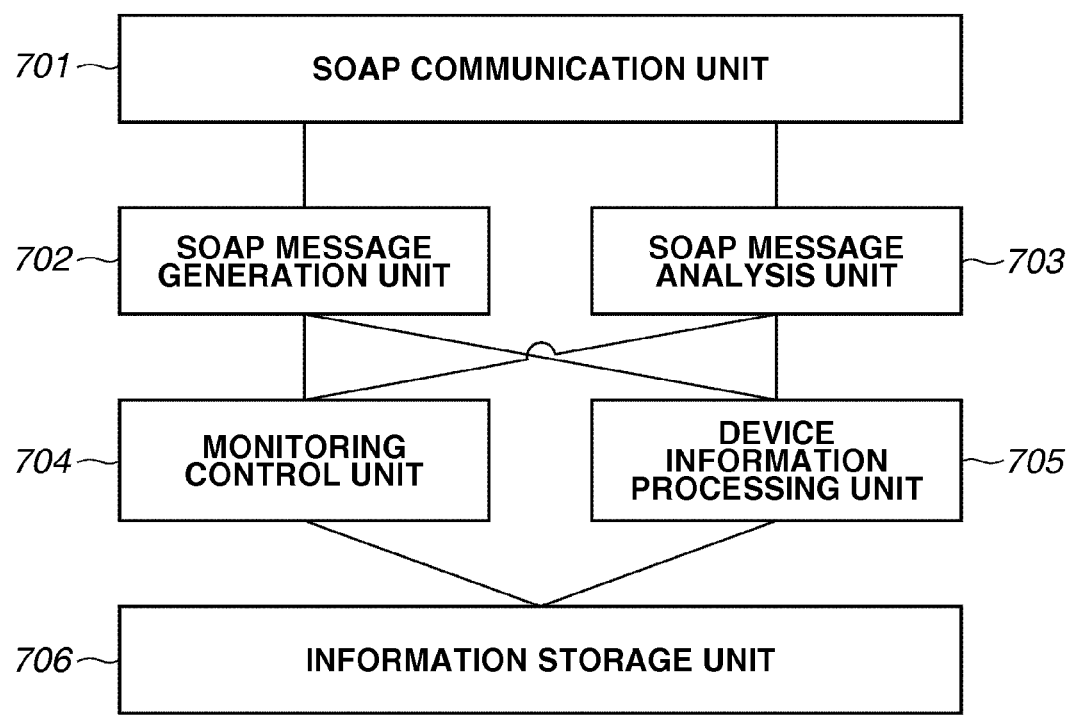
FIG. 7 illustrates an example of a software configuration of the monitoring apparatus according to an exemplary embodiment of the present invention, which relates to the monitoring of the image forming apparatus.

FIG. 7 illustrates an example of a software configuration of the monitoring apparatuses 117, 122, and 123, which relates to the monitoring of the image forming apparatus.

In FIG. 7, a SOAP communication unit 701 can receive SOAP data from the distribution server 111 via the network I/F 307 or 405 and send the received SOAP data to a SOAP message analysis unit 703. The SOAP communication unit 701 can transmit SOAP data generated by a SOAP message generation unit 702 to the distribution server 111 via the network I/F 307 or 405.

The SOAP message analysis unit 703 can analyze the SOAP data sent from the SOAP communication unit 701 and send the SOAP data to at least one of a monitoring control unit 704 and a device information processing unit 705. The monitoring control unit 704 can perform schedule management according to monitoring settings sent from the distribution server 111. To this end, the monitoring control unit 704 updates the "state information of the image forming apparatus" stored in an information storage unit 706 and acquires state information of the image forming apparatus, which is currently monitored by its own device, from the SOAP message analysis unit 703.

The device information processing unit 705 can store the state information (e.g., counter information, service call, jam, and toner shortage information) spontaneously collected from the currently monitored image forming apparatus in the information storage unit 706 according to the schedule managed by the monitoring control unit 704. The storage of the above-described information can be performed in response to a change in the state of the image forming apparatus that is currently monitored by its own device.

The data stored in the information storage unit 706 can be sent to the SOAP message generation unit 702 via the device information processing unit 705. The SOAP message generation unit 702 generates SOAP data based on the received data and sends the generated SOAP data to the SOAP communication unit 701. The data stored in the information storage unit 706 may be interpreted and processed by the device information processing unit 705 before the data is sent to the SOAP message generation unit 702.

Figure 8:
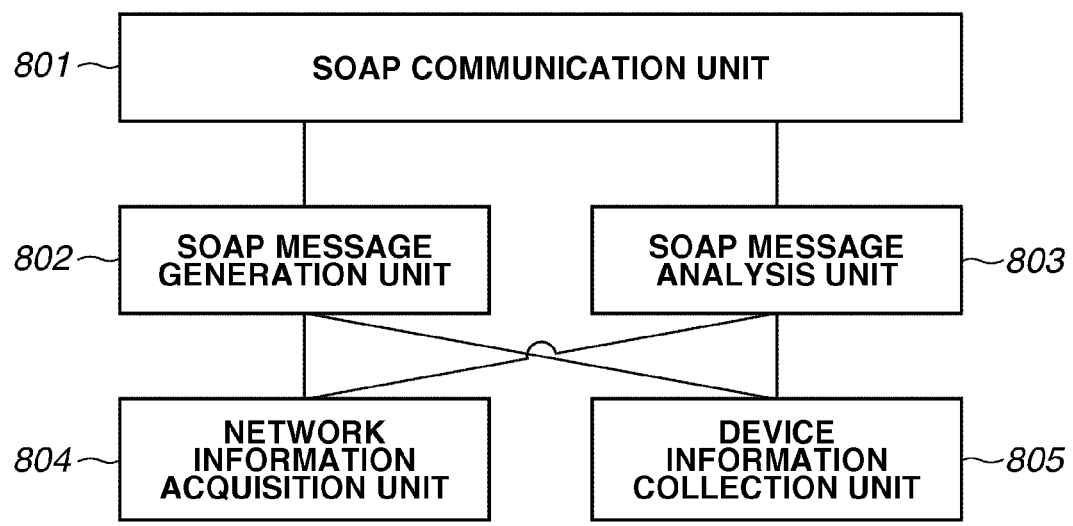
FIG. 8 illustrates an example of a software configuration of the image forming apparatus according to an exemplary embodiment of the present invention, which relates to notification of an operating state of the image forming apparatus.

FIG. 8 illustrates an example of a software configuration of the image forming apparatuses 115 and 116, 120, 121, 124 to 127, and 131, which relates to notification of an operating state of the image forming apparatus. In FIG. 8, a SOAP communication unit 801 can receive SOAP data from the distribution server 111 and the monitoring apparatuses 117, 122, and 123 via the network I/F 505 and send the received SOAP data to a SOAP message analysis unit 803. The SOAP communication unit 801 can further transmit SOAP data generated by a SOAP message generation unit 802 to the distribution server 111 and the monitoring apparatuses 117, 122, and 123 via the network I/F 505.

The SOAP message analysis unit 803 can analyze the SOAP data received from the SOAP communication unit 801 and send the SOAP data to at least one of a network information acquisition unit 804 and a device information collection unit 805.

The network information acquisition unit 804 can automatically acquire an IP address from a Domain Name System (i.e., DNS) server or a gateway server in the Dynamic Host Configuration Protocol (i.e., DHCP) environment. In a case where network information is entered via the operation unit 510 and stored in the HDD 509, the network information acquisition unit 804 can acquire the information.

The device information collection unit 805 can acquire counter information from the image forming apparatus (i.e., its own device) according to the schedule of the image forming apparatus (i.e., its own device) or an instruction from the distribution server 111. The device information collection unit 805 can further acquire information (e.g., service call, jam, and toner shortage) generated in the image forming apparatus (i.e., its own device). The device information collection unit 805 sends the acquired data to the SOAP message generation unit 802. The device information collection unit 805 may temporarily store, interpret, and process the acquired data before sending the data. The SOAP message generation unit 802 generates SOAP data based on the data received from the device information collection unit 805 and sends the generated SOAP data to the SOAP communication unit 801.

Figure 9:
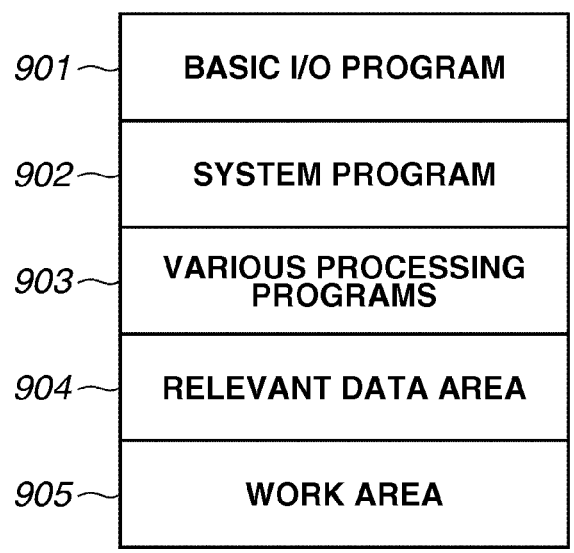
FIG. 9 illustrates an example structure of a memory map in the distribution server, the monitoring apparatus, and the image forming apparatus according to an exemplary embodiment of the present invention.

FIG. 9 illustrates an example structure of a memory map in the distribution server 111, the monitoring apparatuses 117, 122, and 123, and the image forming apparatuses 115 and 116, 120, 121, 124 to 127, and 131. Programs can be loaded into the RAM 204 of the distribution server 111, the RAM 303 or the FlashROM 403 of the monitoring apparatuses 117, 122, and 123, and the RAM 508 of the image forming apparatuses 115 and 116, 120, 121, 124 to 127, and 131. The state of the memory map illustrated in FIG. 9 corresponds to such a loading state.

The memory map illustrated in FIG. 9 includes a basic I/O program 901, a system program 902, and various processing programs 903 including a program that executes processing according to the present exemplary embodiment. The memory map further includes a relevant data area 904 storing related data and a work area 905 for the programs. The basic I/O program 901 controls input/output of the apparatus. The system program 902 provides an operational environment to each processing program. If a memory area to be used as the memory map illustrated in FIG. 9 cannot be secured in the RAMs 204, 303, and 508 due to the lack of capacity, it may be useful to allocate a part of the memory map to the HDDs 205, 206, 304, and 509.

Figure 10:
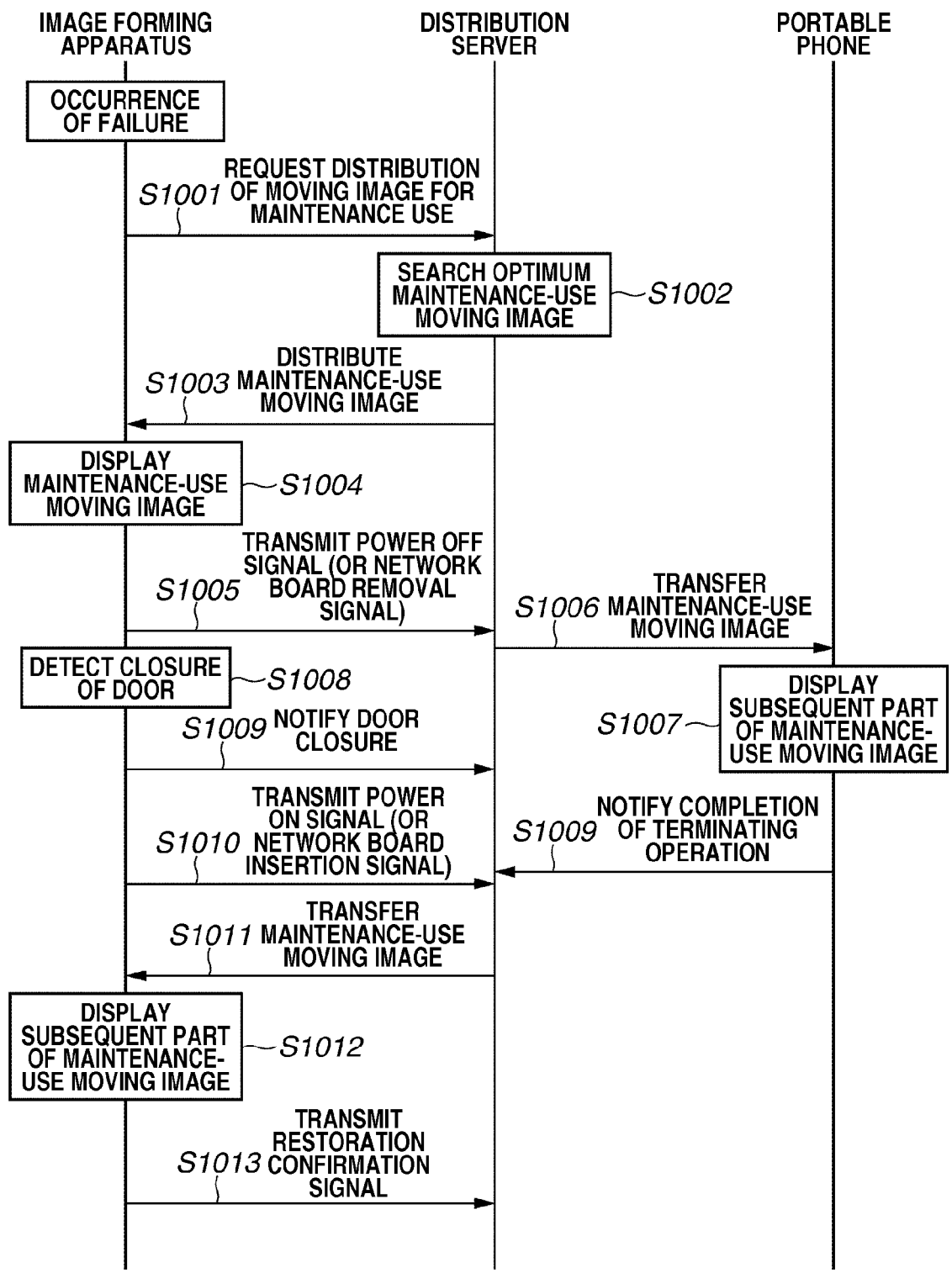
FIG. 10 illustrates an example of an operational sequence that can be performed by the distribution server system, in response to ON/OFF of a power source of an image forming apparatus and a removal of a substrate board from the image forming apparatus, to enable the image forming apparatus to transfer a moving image to a portable terminal according to an exemplary embodiment of the present invention.

FIG. 10 illustrates an example of an operational sequence that can be performed by the distribution server system, in response to ON/OFF of a power source of an image forming apparatus or removal of a substrate board from the image forming apparatus, to enable the image forming apparatus to transfer a moving image to a portable terminal. In the present exemplary embodiment, the distribution server transmits moving images according to a streaming method.

First, as illustrated in FIG. 10, the distribution server system can perform the following sequence to enable an image forming apparatus to transfer a moving image to a portable terminal in response to ON/OFF of a power source of the image forming apparatus. In this case, the image forming apparatus 131 is a representative apparatus selected from the above-described plurality of image forming apparatuses 115 and 116, 120, 121, 124 to 127, and 131. Further, the portable terminal is a portable phone.

If a failure occurs in its own device, then in step S1001, the image forming apparatus 131 requests the distribution server 111 to distribute a moving image for maintenance use. In this case, the image forming apparatus 131 transmits failure information relating to the generated failure to the distribution server 111. As described above, in the present example embodiment, the distribution server 111 can serve as a detection unit configured to receive failure information (see step S1001).

In step S1002, the distribution server 111 searches an optimum maintenance-use moving image based on the failure information transmitted from the image forming apparatus 131.

In step S1003, the distribution server 111 distributes the searched maintenance-use moving image to the image forming apparatus 131. In this case, data of each maintenance-use moving image and failure content are associated with each other and registered beforehand in the database 112 or the distribution server 111. As described above, in the present example embodiment, the distribution server 111 can serve as a first distribution unit configured to distribute a maintenance-use moving image (see step S1003).

In step S1004, the image forming apparatus 131 displays the maintenance-use moving image on its operation panel (i.e., display unit 511). For example, the maintenance-use moving image displayed in this case is a moving image that instructs a user to turn off the power source of the image forming apparatus 131 for maintenance (e.g., repair and inspection).

If the user turns off a power source switch of the image forming apparatus 131 for maintenance, then in step S1005, the image forming apparatus 131 transmits a power off signal indicting an off-state of the power source to the distribution server 111 and turns off its power source. The distribution server 111 receives the information from the image forming apparatus 131 (i.e., information indicating an operation-use moving image displayed on the operation panel immediately before the power source of the image forming apparatus 131 is turned off), and determines a display status of the maintenance-use moving image at the moment when the power off signal was received. As described above, in the present example embodiment, the distribution server 111 can serve as a determination unit configured to determine whether the image forming apparatus 131 has shifted its operation into a maintenance state based on reception of the power off signal (see step S1005).

In step S1006, the distribution server 111 distributes (i.e., transfers) the maintenance-use moving image to a portable phone whose address is registered beforehand. More specifically, the distribution server 111 distributes, to the portable phone, a subsequent part of the maintenance-use moving image that follows the part displayed on the operation panel of the image forming apparatus 131 immediately before the power source of the image forming apparatus 131 is turned off. As described above, in the present example embodiment, the distribution server 111 can serve as a second distribution unit configured to distribute a maintenance-use moving image (see step S1006).

In step S1007, the portable phone displays a pause image of the part displayed immediately before the power source of the image forming apparatus 131 is turned off and then displays the subsequent part of the maintenance-use moving image on the operation panel. A worker performs a maintenance work for the image forming apparatus 131 while viewing the displayed maintenance-use moving image.

In step S1008, the image forming apparatus 131 detects completion of the maintenance work based on closure of a door. In this case, the worker performs a terminating operation (e.g., folds a lid of the portable phone) to stop browsing the maintenance-use moving image.

In step S1009, the image forming apparatus 131 notifies the distribution server 111 of the closure of the door. The portable terminal notifies the distribution server 111 of completion of an operation for terminating the display of the maintenance-use moving image. The distribution server 111 receives the information from the portable phone (i.e., information indicating the operation-use moving image displayed immediately before the terminating operation of the portable phone is performed), and determines a display status of the maintenance-use moving image at the moment when the terminating operation of the portable phone was completed. If the distribution server 111 detects the closure of the door of the image forming apparatus 131 and completion of the terminating operation for the portable phone, the distribution server 111 performs preparation for distributing (i.e., transferring) the maintenance-use moving image to the operation panel of the image forming apparatus 131.

If the worker turns on the power source switch, the image forming apparatus 131 activates the power source. Then, in step S1010, the image forming apparatus 131 transmits a power on signal indicting an on-state of the power source to the distribution server 111.

If the distribution server 111 detects the power on signal transmitted from the image forming apparatus 131, in step S1011, the distribution server 111 distributes (i.e., transfers) the maintenance-use moving image to the image forming apparatus 131. More specifically, the distribution server 111 distributes a subsequent part of the maintenance-use moving image that follows the latest part of the image displayed on the portable phone to the image forming apparatus 131.

In step S1012, the image forming apparatus 131 displays a pause image of the final part of the maintenance-use moving image displayed on the portable phone and then displays a subsequent part of the maintenance-use moving image.

In step S1013, the worker confirms a restoration state of the image forming apparatus 131 based on the maintenance-use moving image displayed on the image forming apparatus 131 and operates the operation unit 510 according to the restoration state. The image forming apparatus 131 transmits a restoration confirmation signal indicating the operation content to the distribution server 111.

If the distribution server 111 receives the restoration confirmation signal, the distribution server 111 determines whether the image forming apparatus 131 has restored. If it is determined that the image forming apparatus 131 has restored, the distribution server 111 terminates the processing of the operational sequence illustrated in FIG. 10. If the distribution server 111 determines that the image forming apparatus 131 has not restored yet, the processing returns to step S1002 to distribute another maintenance-use moving image to the image forming apparatus 131.

Next, an example of the operational sequence that can be performed by the distribution server system in response to removal of a substrate board from the image forming apparatus to enable the image forming apparatus to transfer a moving image to the portable terminal is described below with reference to FIG. 10. In this case, the image forming apparatus 131 is a representative apparatus selected from the above-described plurality of image forming apparatuses 115 and 116, 120, 121, 124 to 127, and 131.

If a failure occurs in its own device, then in step S1001, the image forming apparatus 131 transmits failure information relating to the generated failure to the distribution server 111 and requests the distribution server 111 to distribute a moving image for maintenance use. As described above, in the present example embodiment, the distribution server 111 can serve as the detection unit configured to receive failure information (see step S1001).

In step S1002, the distribution server 111 searches an optimum maintenance-use moving image based on the failure information transmitted from the image forming apparatus 131. In step S1003, the distribution server 111 distributes the searched maintenance-use moving image to the image forming apparatus 131. As described above, in the present example embodiment, the distribution server 111 can serve as the first distribution unit configured to distribute a maintenance-use moving image (see step S1003).

In step S1004, the image forming apparatus 131 displays the maintenance-use moving image on its operation panel (i.e., display unit 511). For example, the maintenance-use moving image displayed in this case is a moving image that instructs a user to remove a network board from the image forming apparatus 131 for maintenance.

If the user removes the network board from the image forming apparatus 131 for maintenance, then in step S1005, the image forming apparatus 131 transmits a network board removal signal indicating removal of the network board to the distribution server 111. The distribution server 111 receives the information from the image forming apparatus 131, and determines a display status of the maintenance-use moving image at the moment when the network board removal signal was received.

As described above, in the present example embodiment, the distribution server 111 can serve as the determination unit configured to determine whether the image forming apparatus 131 has shifted its operation into the maintenance state based on reception of the network board removal signal (see step S1005).

In step S1006, the distribution server 111 distributes (i.e., transfers) the maintenance-use moving image to a portable phone whose address is registered beforehand. As described above, in the present example embodiment, the distribution server 111 can serve as the second distribution unit configured to distribute a maintenance-use moving image (see step S1006).

In step S1007, the portable phone displays a subsequent part of the maintenance-use moving image that follows the part displayed on the operation panel immediately before the network board is removed from the image forming apparatus 131. A worker performs a maintenance work for the image forming apparatus 131 while viewing the displayed maintenance-use moving image.

In step S1008, the image forming apparatus 131 detects completion of the maintenance work based on closure of a door. In this case, the worker performs a terminating operation (e.g., folds a lid of the portable phone) to stop browsing the maintenance-use moving image.

In step S1009, the image forming apparatus 131 notifies the distribution server 111 of the closure of the door. The portable terminal notifies the distribution server 111 of completion of an operation for terminating the display of the maintenance-use moving image. The distribution server 111 receives the information from the portable phone, and determines a display status of the maintenance-use moving image at the moment when the terminating operation of the portable phone was completed. If the distribution server 111 detects the closure of the door of the image forming apparatus 131 and completion of the terminating operation for the portable phone, the distribution server 111 performs preparation for distributing (i.e., transferring) the maintenance-use moving image to the operation panel of the image forming apparatus 131.

If the worker inserts the network board to the image forming apparatus 131, then in step S1010, the image forming apparatus 131 transmits a network board insertion signal indicating insertion of the network board to the distribution server 111.

If the distribution server 111 detects the network board insertion signal transmitted from the image forming apparatus 131, then in step S1011, the distribution server 111 distributes (i.e., transfers) the maintenance-use moving image to the image forming apparatus 131. More specifically, the distribution server 111 distributes a subsequent part of the maintenance-use moving image that follows the latest part of the image displayed on the portable phone to the image forming apparatus 131.

In step S1012, the image forming apparatus 131 displays a pause image of the final part of the maintenance-use moving image displayed on the portable phone and then displays a subsequent part of the maintenance-use moving image.

In step S1013, the worker confirms a restoration state of the image forming apparatus 131 based on the maintenance-use moving image displayed on the image forming apparatus 131 and operates the operation unit 510 according to the restoration state. The image forming apparatus 131 transmits a restoration confirmation signal indicating the operation content to the distribution server 111.

If the distribution server 111 receives the restoration confirmation signal, the distribution server 111 determines whether the image forming apparatus 131 has restored. If it is determined that the image forming apparatus 131 has restored, the distribution server 111 terminates the processing of the operational sequence illustrated in FIG. 10. If the distribution server 111 determines that the image forming apparatus 131 has not restored yet, the processing returns to step S1102 to distribute another maintenance-use moving image to the image forming apparatus 131.

Figure 11:
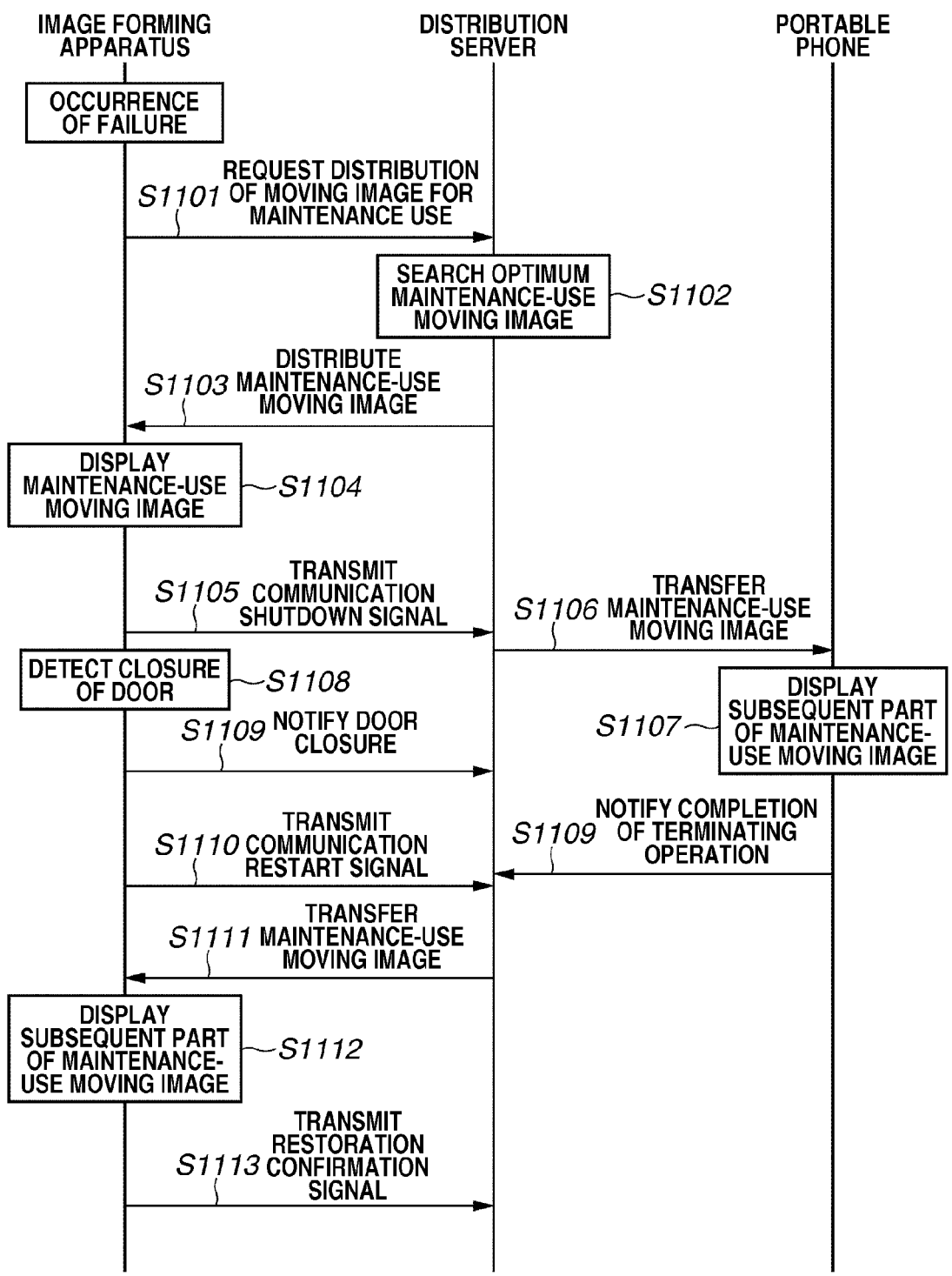
FIG. 11 illustrates an example of an operational sequence that can be performed by the distribution server system, in response to a disconnection of infrared communication between an image forming apparatus and a portable phone, to enable the image forming apparatus to transfer a moving image to a portable terminal according to an exemplary embodiment of the present invention.

FIG. 11 illustrates an example of the operational sequence that can be performed by the distribution server system, in response to a disconnection of infrared communication between the image forming apparatus and a portable phone, to enable the image forming apparatus to transfer a moving image to a portable terminal. In this case, the image forming apparatus 131 is a representative apparatus selected from the above-described plurality of image forming apparatuses 115 and 116, 120, 121, 124 to 127, and 131.

If a failure occurs in its own device, then in step S1101, the image forming apparatus 131 transmits failure information relating to the generated failure and requests the distribution server 111 to distribute a moving image for maintenance use. As described above, according to the present example embodiment, the distribution server 111 can serve as the detection unit configured to receive failure information (see step S1101).

In step S1102, the distribution server 111 searches an optimum maintenance-use moving image based on the failure information transmitted from the image forming apparatus 131.

In step S1103, the distribution server 111 distributes the searched maintenance-use moving image to the image forming apparatus 131. In the present exemplary embodiment, data of the maintenance-use moving image and failure contents are associated with each other and registered beforehand in the database 112 or the distribution server 111. As described above, in the present example embodiment, the distribution server 111 can serve as the first distribution unit configured to distribute a maintenance-use moving image (see step S1103).

In step S1104, the image forming apparatus 131 displays the maintenance-use moving image on its operation panel (i.e., the display unit 511). When a user browses the displayed maintenance-use moving image, the user determines that it is necessary to depart (move) from the image forming apparatus 131 for a maintenance work of the image forming apparatus 131.

If the infrared communication between the image forming apparatus 131 and the portable phone is disconnected due to the movement of the user, then in step S1105, the image forming apparatus 131 transmits a communication shutdown signal indicating disconnection of a link of the infrared communication with the portable phone to the distribution server 111. Then, the distribution server 111 receives the information from the image forming apparatus 131 (i.e., information indicating the operation-use moving image displayed on the operation panel immediately before the infrared communication is disconnected), and determines a display status of the maintenance-use moving image at the moment when the communication shutdown signal was received. As described above, in the present example embodiment, the distribution server 111 can serve as a determination unit configured to determine whether the image forming apparatus 131 has shifted its operation into the maintenance state based on reception of the communication shutdown signal (see step S1105).

In step S1106, the distribution server 111 distributes (i.e., transfers) the maintenance-use moving image to the portable phone whose address is registered beforehand and whose infrared communication with the image forming apparatus 131 is disconnected. More specifically, the distribution server 111 distributes a subsequent part of the maintenance-use moving image that follows the latest part of the image displayed on the portable phone immediately before the infrared communication between the image forming apparatus 131 and the portable phone is disconnected to the portable phone. As described above, in the present example embodiment, the distribution server 111 can serve as the second distribution unit configured to distribute a maintenance-use moving image (see step S1106).

In step S1107, the portable phone displays a pause image of the part displayed immediately before the infrared communication with the image forming apparatus 131 is disconnected and then displays the subsequent part of the maintenance-use moving image on the operation panel. A worker performs a maintenance work for the image forming apparatus 131 while viewing the displayed maintenance-use moving image.

In step S1108, the image forming apparatus 131 detects completion of the maintenance work based on closure of a door. In this case, the worker performs a terminating operation (e.g., folds a lid of the portable phone) to stop browsing the maintenance-use moving image.

In step S1009, the image forming apparatus 131 notifies the distribution server 111 of the closure of the door. The portable phone notifies the distribution server 111 of completion of an operation for terminating the display of the maintenance-use moving image. The distribution server 111 receives the information from the portable phone (i.e., information indicating the operation-use moving image displayed immediately before the terminating operation of the portable phone is performed), and determines a display status of the maintenance-use moving image at the moment when the terminating operation of the portable phone was completed. If the distribution server 111 detects the closure of the door of the image forming apparatus 131 and completion of the terminating operation for the portable phone, the distribution server 111 performs preparation for distributing (i.e., transferring) the maintenance-use moving image to the operation panel of the image forming apparatus 131.

If the image forming apparatus 131 restarts the infrared communication with the portable phone, then in step S1110, the image forming apparatus 131 transmits a communication restart signal indicating restart of the infrared communication to the distribution server 111.

If the distribution server 111 detects the communication restart signal transmitted from the image forming apparatus 131, then in step S1111, the distribution server 111 distributes (i.e., transfers) the maintenance-use moving image to the image forming apparatus 131. More specifically, the distribution server 111 distributes a subsequent part of the maintenance-use moving image that follows the latest part of the image displayed on the portable phone to the image forming apparatus 131.

In step S1112, the image forming apparatus 131 displays a pause image of the final part of the maintenance-use moving image displayed on the portable phone and then displays a subsequent part of the maintenance-use moving image.

In step S1113, the worker confirms a restoration state of the image forming apparatus 131 based on the maintenance-use moving image displayed on the image forming apparatus 131 and operates the operation unit 510 according to the restoration state. The image forming apparatus 131 transmits a restoration confirmation signal indicating the operation content to the distribution server 111.

If the distribution server 111 receives the restoration confirmation signal, the distribution server 111 determines whether the image forming apparatus 131 has restored. If it is determined that the image forming apparatus 131 has restored, the distribution server 111 terminates the processing of the operational sequence illustrated in FIG. 11. If the distribution server 111 determines that the image forming apparatus 131 has not restored yet, the processing returns to step S1102 to distribute another maintenance-use moving image to the image forming apparatus 131.

Figure 12:
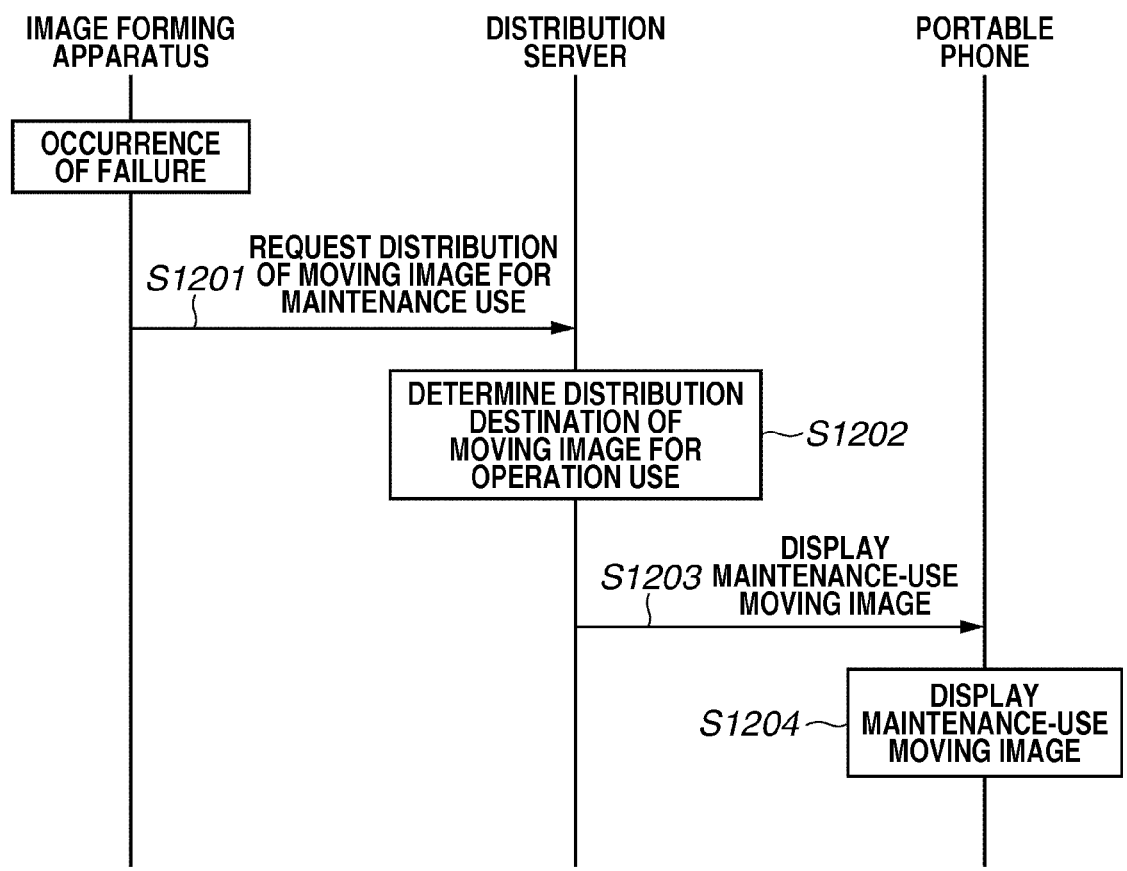
FIG. 12 illustrates an example of an operational sequence that can be performed by the distribution server system according to an exemplary embodiment of the present invention, in a case where a moving image is distributed to an appropriate one of an operation panel of an image forming apparatus and a portable terminal of a worker according to a failure generation place of the image forming apparatus.

FIG. 12 illustrates an example of an operational sequence that can be performed by the distribution server system, in a case where a moving image is distributed to an appropriate one of the operation panel of the image forming apparatus and the portable terminal according to a failure generation place of the image forming apparatus. In this case, the image forming apparatus 131 is a representative apparatus selected from the above-described plurality of image forming apparatuses 115 and 116, 120, 121, 124 to 127, and 131.

If a failure occurs in its own device, then in step S1201, the image forming apparatus 131 transmits failure information relating to the generated failure and requests the distribution server 111 to distribute a moving image for maintenance use. As described above, according to the present example embodiment, the distribution server 111 can serve as the detection unit configured to receive failure information (see step S1201).

In step S1202, the distribution server 111 identifies a failure generation place based on the failure information transmitted from the image forming apparatus 131, and determines a distribution destination of a moving image for operation use. In the present exemplary embodiment, the distribution destination of an operation-use moving image and the failure generation place are associated with each other and registered beforehand in the database 112 or the distribution server 111. The distribution server 111 can determine the distribution destination of the operation-use moving image referring to the registered contents.

For example, if the failure generation place is far from the operation panel of the image forming apparatus 131, the distribution server 111 determines the portable phone as the distribution destination of the operation-use moving image. If the failure generation place is close to the operation panel of the image forming apparatus 131, the distribution server 111 determines the image forming apparatus 131 as the distribution destination of the operation-use moving image. According to the example illustrated in FIG. 12, the failure generation place is far from the operation panel of the image forming apparatus 131. Therefore, the distribution server 111 determines the portable phone as the distribution destination of the operation-use moving image. As described above, in the present example embodiment, the distribution server 111 can serve as a selection unit configured to select a distribution destination of an operation-use moving image (see step S1202).

In step S1203, the distribution server 111 distributes the maintenance-use moving image to the portable phone (i.e., the distribution destination determined in step S1202). As described above, the distribution server 111 can serve as the first distribution unit configured to distribute a maintenance-use moving image (see step S1203).

In step S1204, the portable phone displays the maintenance-use moving image distributed from the distribution server 111.

If the portable phone is determined as the distribution destination of the operation-use moving image in step S1202 as illustrated in FIG. 12, the processing of step S1008 and the subsequent steps in FIG. 10 or the processing of step S1108 and subsequent steps in FIG. 11 can be performed after completing the processing of step S1204. If the image forming apparatus is determined as the distribution destination of the operation-use moving image in step S1202, the processing of step S1004 and subsequent steps in FIG. 10 or the processing of step S1104 and subsequent steps in FIG. 11 can be performed after completing the processing of step S1203.

Figure 13:
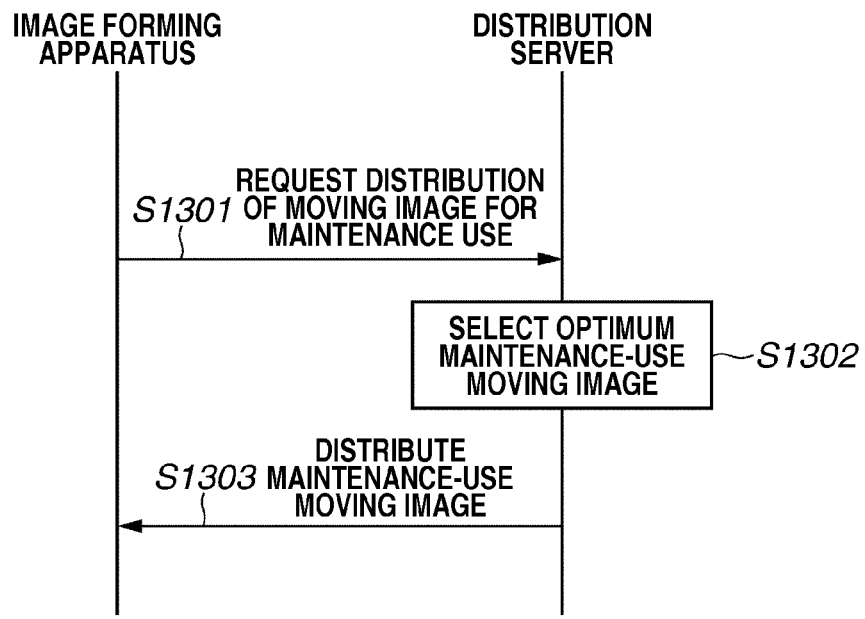
FIG. 13 illustrates an example of an operational sequence that can be performed by the distribution server system according to an exemplary embodiment of the present invention, in a case where the distribution server manages account information (i.e., log-in information of an image forming apparatus) and distributes an optimum moving image for each account.

FIG. 13 illustrates an example of an operational sequence that can be performed by the distribution server system, in a case where the distribution server manages account information (i.e., log-in information of an image forming apparatus) and distributes an optimum moving image for each account. In this case, the image forming apparatus 131 is a representative apparatus selected from the above-described plurality of image forming apparatuses 115 and 116, 120, 121, 124 to 127, and 131.

In step S1301, the image forming apparatus 131 transmits account information obtained in the log-in processing to the distribution server 111 and requests the distribution server 111 to distribute a moving image for maintenance use. As described above, in the present example embodiment, the distribution server 111 can serve as a detection unit configured to receive account information (see step S1301).

In step S1302, the distribution server 111 selects an optimum maintenance-use moving image for the account based on the account information transmitted from the image forming apparatus 131. In the present exemplary embodiment, data of the maintenance-use moving image and the account are associated with each other and registered beforehand in the database 112 or the distribution server 111. The distribution server 111 selects an optimum maintenance-use moving image from the registered contents.

For example, if the account is for a deaf person, the distribution server 111 selects a maintenance-use moving image that displays a sign language. If the account is for a service engineer, the distribution server 111 selects a maintenance-use moving image that displays detailed maintenance information. If the account is for a blind person, the distribution server 111 selects a maintenance-use moving image that provides speech guidance for maintenance contents. If the account is for a wheel chaired person, the distribution server 111 selects a maintenance-use moving image that can be displayed at a lower height. As described above, in the present example embodiment, the distribution server 111 can serve as an acquisition unit configured to select a maintenance-use moving image (see step S1302).

In step S1303, the distribution server 111 distributes the maintenance-use moving image selected in step S1302 to the image forming apparatus 131. As described above, in the present example embodiment, the distribution server 111 can serve as the first distribution unit configured to distribute a maintenance-use moving image (see step S1303).

The maintenance-use moving image, which was selected as described above, can be distributed to the distribution destination of the moving image as described above. For example, the processing of step S1004 and subsequent steps in FIG. 10 or the processing of step S1104 and subsequent steps in FIG. 11 can be performed after completing the processing of step S1303. Further, in step S1303, the distribution server 111 can distribute the maintenance-use moving image to the portable terminal, instead of the image forming apparatus.

Figure 14:
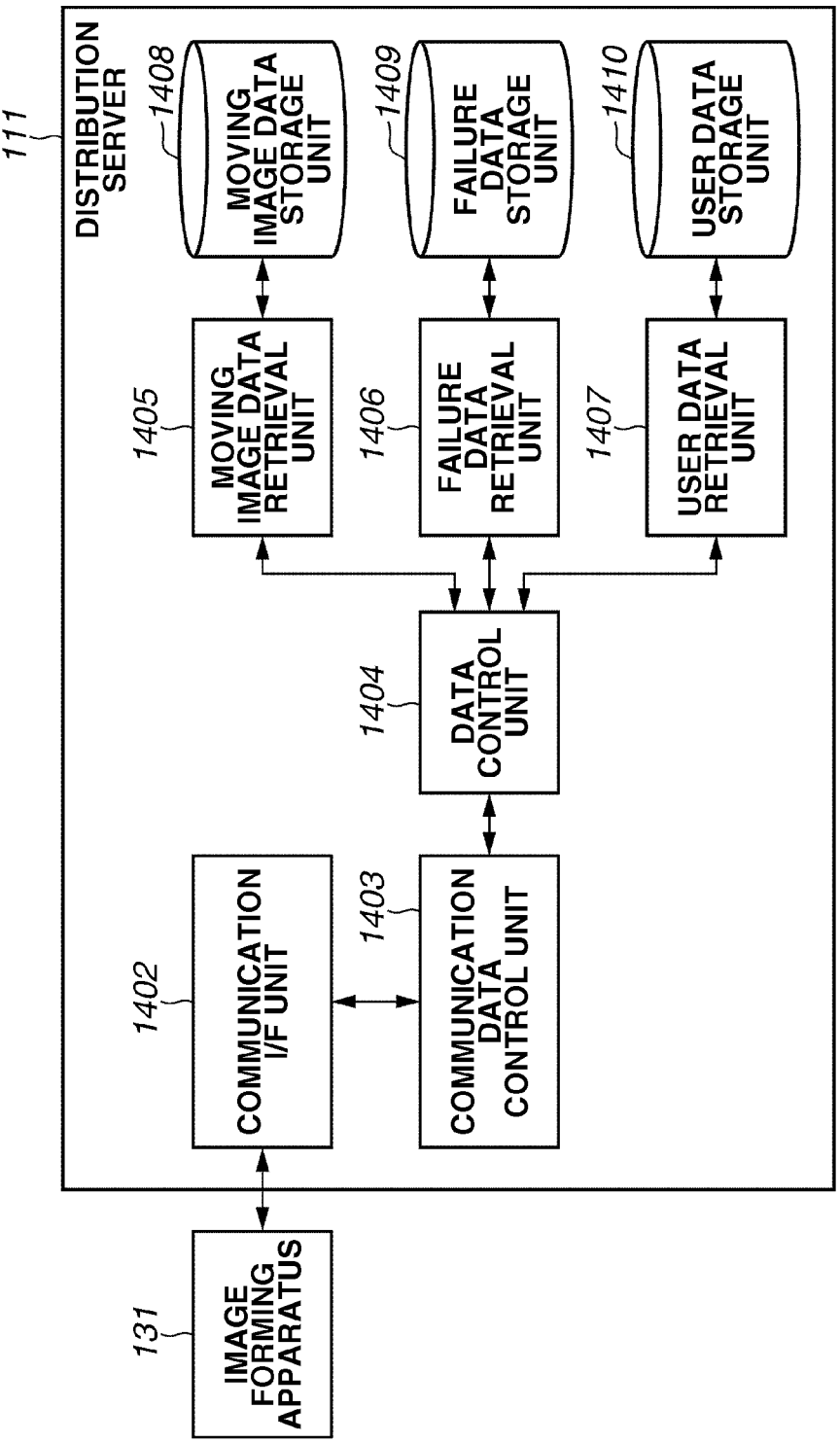
FIG. 14 is a block diagram illustrating an example of a functional configuration of the distribution server according to an exemplary embodiment of the present invention.

FIG. 14 is a block diagram illustrating an example of a functional configuration of the distribution server 111. In FIG. 14, the image forming apparatus 131 is a representative apparatus selected from the above-described plurality of image forming apparatuses 115 and 116, 120, 121, 124 to 127, and 131.

In FIG. 14, a communication I/F unit 1402 can perform communications with the image forming apparatus 131 and a portable terminal. A communication data control unit 1403 can control data received from the communication I/F unit 1402. A data control unit 1404 can control moving image data, failure data, and user data. In the present exemplary embodiment, the moving image data includes data of maintenance-use moving images. The failure data includes data indicating failure information (e.g., error, alarm, and jam) of the image forming apparatus 131. The user data includes an address of a portable terminal owned by a user of the image forming apparatus 131 and account information of the user.

A moving image data retrieval unit 1405 can search moving image data registered in a moving image data storage unit 1408. A failure data retrieval unit 1406 can search failure data registered in a failure data storage unit 1409. A user data retrieval unit 1407 can search user data registered in a user data storage unit 1410. The moving image data storage unit 1408 is a database that can store moving image data. The failure data storage unit 1409 is a database that can store failure data. The user data storage unit 1410 is a database that can store user data. As described above, the user data retrieval unit 1407, the moving image data storage unit 1408, and the failure data storage unit 1409 may not be provided in the distribution server 111.

Figure 15:
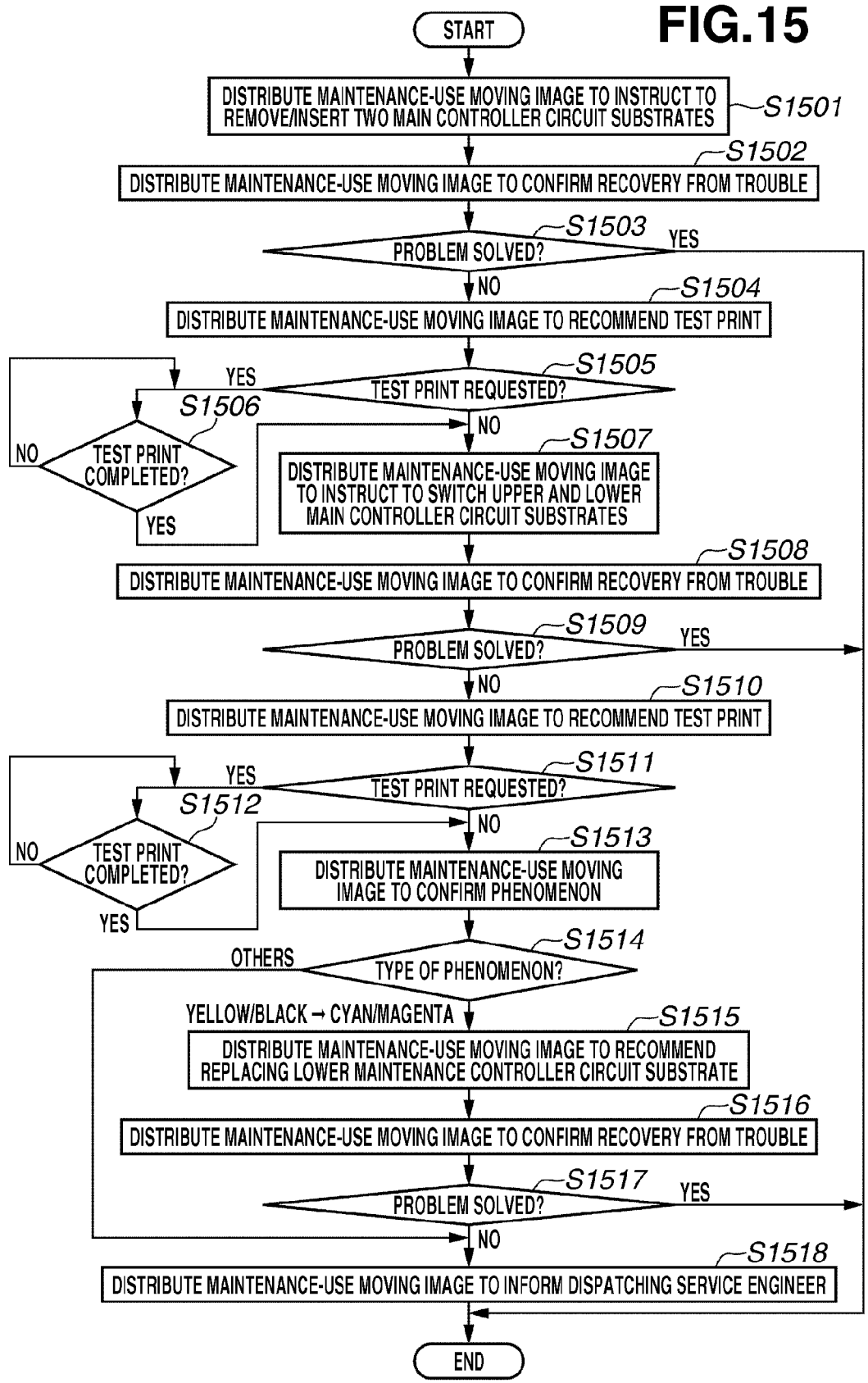
FIG. 15 is a flowchart illustrating an example of first processing that can be performed by the distribution server to distribute maintenance-use moving images according to an exemplary embodiment of the present invention.

FIG. 15 is a flowchart illustrating an example of first processing that can be performed by the distribution server 111 to distribute maintenance-use moving images. In this case, the distribution server 111 distributes a maintenance-use moving image in a case where only yellow/black of a print image becomes white due to defectiveness in image formation.

It is now assumed that the processing of step S1002 in FIG. 10, step S1102 in FIG. 11, step S1202 in FIG. 12, and step S1302 in FIG. 13 are completed before starting the flowchart of FIG. 15. In step S1501, the distribution server 111 distributes a maintenance-use moving image that instructs removing/inserting two main controller circuit substrates to the image forming apparatus 131.

In step S1502, the distribution server 111 distributes a maintenance-use moving image, which is used to confirm whether the problem has been solved, to the image forming apparatus 131.

In step S1503, the distribution server 111 determines whether the problem has been solved referring to the information transmitted from the image forming apparatus 131. If it is determined that the problem has been solved (YES in step S1503), the distribution server 111 terminates the processing of the flowchart illustrated in FIG. 15. If it is determined that the problem has not been solved (NO in step S1503), the processing proceeds to step S1504.

In step S1504, the distribution server 111 distributes a maintenance-use moving image, which is used to recommend a test print to confirm a printed state, to the image forming apparatus 131. As described above, in the present example embodiment, the first distribution unit can be realized by the distribution server 111 that executes the processing of steps S1501, S1502, and S1504.

In step S1505, the distribution server 111 determines whether to request the test print referring to the information transmitted from the image forming apparatus 131. If it is determined that the test print is to be requested (YES in step S1505), the processing proceeds to step S1506. In step S1506, the distribution server 111 determines whether the test print is completed referring to the information transmitted from the image forming apparatus 131. If the test print is completed (YES in step S1506), the processing proceeds to step S1507. If the test print is not to be requested (NO in step S1505), the processing directly proceeds to step S1507.

In step S1507, the distribution server 111 distributes another maintenance-use moving image that instructs switching the upper and lower main controller circuit substrates. In this case, if the image forming apparatus 131 shifts its operation into the maintenance state, the distribution server 111 distributes (automatically transfers) the maintenance-use moving image to a portable terminal (e.g., a portable phone, a laptop PC, or a desktop PC) registered beforehand.

In step S1508, the distribution server 111 distributes the maintenance-use moving image, which is used to confirm whether the problem has been solved, to the image forming apparatus 131 or the portable terminal.

In step S1509, the distribution server 111 determines whether the problem has been solved referring to the information transmitted from at least one of the image forming apparatus 131 and the portable terminal. If it is determined that the problem has been solved (YES in step S1509), the distribution server 111 terminates the processing of the flowchart illustrated in FIG. 15. If it is determined that the problem has not been solved (NO in step S1509), the processing proceeds to step S1510. In step S1510, the distribution server 111 distributes the maintenance-use moving image, which is used to recommend a test print to confirm a printed state, to the image forming apparatus 131.

In step S1511, the distribution server 111 determines whether to request the test print referring to the information transmitted from the image forming apparatus 131 or the portable phone. If it is determined that the test print is to be requested (YES in step S1511), the processing proceeds to step S1512. In step S1512, the distribution server 111 determines whether the test print is completed referring to the information transmitted from the image forming apparatus 131. If it is determined that the test print is completed (YES in step S1512), the processing proceeds to step S1513. If it is determined that the test print is not to be requested (NO in step S1511), the processing directly proceeds to step S1513.

In step S1513, the distribution server 111 distributes a maintenance-use moving image, which is used to confirm a phenomenon resulting from the test print, to the image forming apparatus 131 or the portable terminal. In a case where it is determined that the test print is not to be requested (NO in step S1511), a user manually determines the phenomenon based on a printed result.

In step S1514, the distribution server 111 determines a type of the phenomenon referring to the information transmitted from the image forming apparatus 131. If the user selects "change from yellow/black to cyan/magenta" while browsing the maintenance-use moving image distributed in step S1513, the processing proceeds to step S1515. If the user selects "others", the processing proceeds to step S1518 because the user cannot solve the failure.

In step S1515, the distribution server 111 distributes another maintenance-use moving image, which is used to instruct replacing the lower main controller circuit substrate. In this case, if the image forming apparatus 131 shifts its operation into the maintenance state, the distribution server 111 distributes (automatically transfers) the maintenance-use moving image to a portable terminal (e.g., a portable phone, a laptop PC, or a desktop PC) registered beforehand.

In step S1516, the distribution server 111 distributes the maintenance-use moving image, which is used to confirm whether the problem has been solved, to the image forming apparatus 131 or the portable terminal.

In step S1517, the distribution server 111 determines whether the problem has been solved referring to the information transmitted from at least one of the image forming apparatus 131 and the portable terminal. If it is determined that the problem has been solved (YES in step S1517), the distribution server 111 terminates the processing of the flowchart illustrated in FIG. 15. If it is determined that the problem has not been solved (NO in step S1517), the processing proceeds to step S1518. In step S1518, the distribution server 111 distributes a maintenance-use moving image, which is used to inform dispatching a service engineer, because the user cannot restore the image forming apparatus 131. For example, the distribution server 111 sends an instruction mail to the service engineer to be dispatched.

As described above, in the present example embodiment, the second distribution unit can be realized by the distribution server 111 that executes the processing of steps S1507, S1508, S1510, S1513, S1515, S1516, and S1518.

Figure 16:
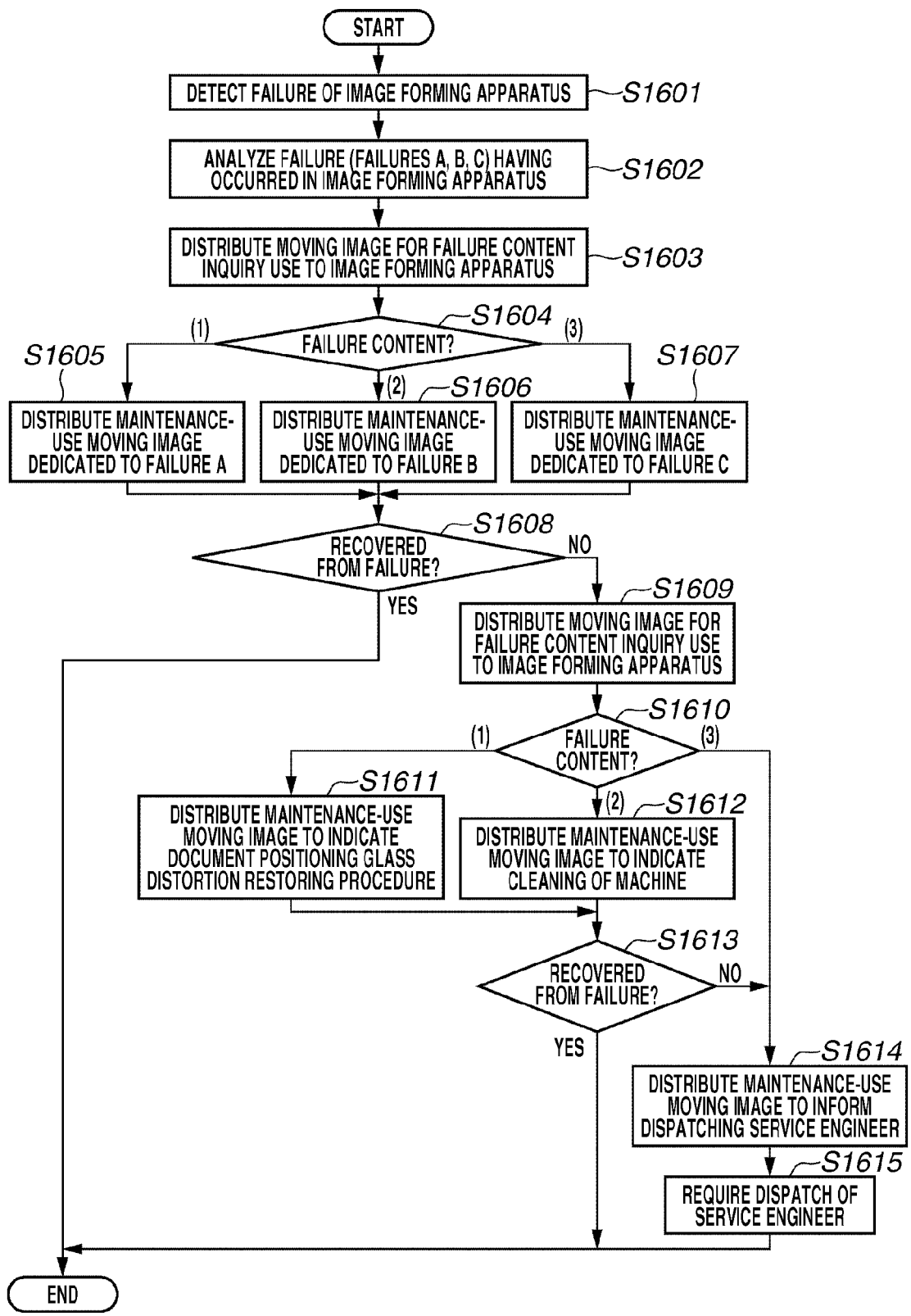
FIG. 16 is a flowchart illustrating an example of second processing that can be performed by distribution server to distribute maintenance-use moving images according to an exemplary embodiment of the present invention.

FIG. 16 is a flowchart illustrating an example of second processing that can be performed by the distribution server 111 to distribute maintenance-use moving images. In this case, the distribution server 111 performs interactive communications with the image forming apparatus 131 or a portable terminal to distribute maintenance-use moving images.

If the distribution server 111 receives failure information from the image forming apparatus 131, then in step S1601, the distribution server 111 detects a failure having occurred in the image forming apparatus 131. As described above, in the present example embodiment, the detection unit can be realized by the distribution server 111 that executes the processing of step S1601.

For example, the distribution server 111 can execute the processing of steps S1002 to S1005 of FIG. 10 and steps S1102 to S1105 of FIG. 11 after completing the processing of step S1601.

In step S1602, the distribution server 111 analyzes the failure generated in the image forming apparatus 131 based on "an error code, an alarm code, or a jam code" included in the failure information. In this case, as a result of the analysis, the distribution server 111 determines that the failure is failure A, failure B, or failure C. FIG. 18 illustrates examples of the error code, the alarm code, and the jam code.

In step S1603, the distribution server 111 distributes a failure content inquiry-use moving image, which is used to inquire the content of the failure generated in the image forming apparatus 131, to the image forming apparatus 131. The image forming apparatus 131 displays a failure content inquiry-use moving image 1701 on its operation panel as illustrated in FIG. 17A. A user operates the operation unit 510 of the image forming apparatus 131 to select one of choices (1) to (3), which corresponds to the failure generated by the image forming apparatus 131, from the failure content inquiry-use moving image 1701. The image forming apparatus 131 transmits information indicating the selected content to the distribution server 111. As described above, in the present example embodiment, an inquiry unit can be realized by the distribution server 111 that executes the processing of step S1603.

In step S1604, the distribution server 111 determines the failure generated in the image forming apparatus 131 referring to the information transmitted from the image forming apparatus 131. If it is determined that the item (1) is selected on the failure content inquiry-use moving image 1701, the processing proceeds to step S1605.

In step S1605, the distribution server 111 distributes a maintenance-use moving image dedicated to the failure A to the image forming apparatus 131. The image forming apparatus 131 displays the maintenance-use moving image dedicated to the failure A on its operation panel. The user performs a maintenance work while viewing the displayed maintenance-use moving image dedicated to the failure A. Then, the image forming apparatus 131 transmits information indicating a restoration state of its own device to the distribution server 111. Then, the processing proceeds to step S1608.

If in step S1604 it is determined that the item (2) is selected on the failure content inquiry-use moving image 1701, the processing proceeds to step S1606. In step S1606, the distribution server 111 distributes a maintenance-use moving image dedicated to the failure B to the image forming apparatus 131. The image forming apparatus 131 displays the maintenance-use moving image dedicated to the failure B on its operation panel. The user performs a maintenance work while viewing the displayed maintenance-use moving image dedicated to the failure B. Then, the image forming apparatus 131 transmits information indicating a restoration state of its own device to the distribution server 111. Then, the processing proceeds to step S1608.

If in step S1604 it is determined that the item (3) is selected on the failure content inquiry-use moving image 1701, the processing proceeds to step S1607. In step S1607, the distribution server 111 distributes a maintenance-use moving image dedicated to the failure C to the image forming apparatus 131. The image forming apparatus 131 displays the maintenance-use moving image dedicated to the failure C on its operation panel. The user performs a maintenance work while viewing the maintenance-use moving image dedicated to the failure C. Then, the image forming apparatus 131 transmits information indicating a restoration state of its own device to the distribution server 111. Then, the processing proceeds to step S1608. As described above, in the present example embodiment, the second distribution unit can be realized by the distribution server 111 that executes the processing of steps S1605 to S1607.

In step S1608, the distribution server 111 determines whether the image forming apparatus 131 has recovered from the failure referring to the information transmitted from the image forming apparatus 131. If it is determined that the image forming apparatus 131 has recovered from the failure (YES in step S1608), the distribution server 111 terminates the processing of the flowchart illustrated in FIG. 16. If it is determined that the image forming apparatus 131 has not yet recovered from the failure (NO in step S1608), the processing proceeds to step S1609.

In step S1609, the distribution server 111 distributes another failure content inquiry-use moving image to the image forming apparatus 131. The image forming apparatus 131 displays a failure content inquiry-use moving image 1702 on its operation panel as illustrated in FIG. 17B. The user operates the operation unit 510 of the image forming apparatus 131 to select one of choices (1) to (3), which corresponds to the failure generated by the image forming apparatus 131, from the failure content inquiry-use moving image 1702. The image forming apparatus 131 transmits information indicating the selected content to the distribution server 111. As described above, in the present example embodiment, the inquiry unit can be realized by the distribution server 111 that executes the processing of step S1609.

In step S1610, the distribution server 111 determines the failure generated in the image forming apparatus 131 referring to the information transmitted from the image forming apparatus 131. If it is determined that the item (1) is selected on the failure content inquiry-use moving image 1702, the processing proceeds to step S1611.

In step S1611, the distribution server 111 distributes a maintenance-use moving image, which is used to instruct restoring a document positioning glass plate of the image forming apparatus 131 from a distorted state, to the image forming apparatus 131. The image forming apparatus 131 displays the maintenance-use moving image that instructs restoring the document positioning glass plate of the image forming apparatus 131 from the distorted state, on its operation panel. The user adjusts the position of the document positioning glass plate while viewing the maintenance-use moving image that instructs restoring the document positioning glass plate of the image forming apparatus 131 from the distorted state. Then, the image forming apparatus 131 transmits information indicating a restoration state of its own device to the distribution server 111. Then, the processing proceeds to step S1613.

If in step S1610 it is determined that the item (2) is selected on the failure content inquiry-use moving image 1702, the processing proceeds to step S1612. In step S1612, the distribution server 111 distributes a maintenance-use moving image that instructs cleaning the machine to the image forming apparatus 131. The image forming apparatus 131 displays the maintenance-use moving image that instructs cleaning the machine, on its operation panel. The user cleans the inside of the machine while viewing the maintenance-use moving image that instructs cleaning of the inside of the machine. Then, the image forming apparatus 131 transmits information indicating a restoration state of its own device to the distribution server 111. Then, the processing proceeds to step S1613.

In step S1613, the distribution server 111 determines whether the image forming apparatus 131 has recovered from the failure referring to the information transmitted from the image forming apparatus 131. If it is determined that the image forming apparatus 131 has recovered from the failure (YES in step S1613), the distribution server 111 terminates the processing of the flowchart illustrated in FIG. 16. If it is determined that the image forming apparatus 131 has not yet recovered from the failure (NO in step S1613), the processing proceeds to step S1614. If in step S1610 it is determined that the item (3) is selected on the failure content inquiry-use moving image 1702, the processing proceeds to step S1614.

In step S1614, the distribution server 111 distributes, to the image forming apparatus 131, a maintenance-use moving image that urges dispatch of a service engineer because the user cannot restore the image forming apparatus 131. As described above, in the present example embodiment, the second distribution unit can be realized by the distribution server 111 that execute the processing of steps S1611, S1612, and S1614.

In step S1615, the distribution server 111 sends, for example, an instruction mail to the service engineer to be dispatched.

According to the example illustrated in FIG. 16, the image forming apparatus 131 communicates with the distribution server 111. However, if the distribution server 111 cannot communicate with the image forming apparatus 131, then in step S1603, the distribution server 111 can distribute the failure content inquiry-use moving image to a portable terminal. Further, in steps S1605 to S1607, S1611, S1612, and S1614, the distribution server 111 can distribute the maintenance-use moving images to the portable terminal.

As described above, in the present exemplary embodiment, the distribution server 111 distributes a maintenance-use moving image to an image forming apparatus and then manages a displayed status of the maintenance-use moving image in the image forming apparatus. If the image forming apparatus shifts its operation into the maintenance state, the distribution server 111 transfers a subsequent part of the maintenance-use moving image to a portable terminal that is registered beforehand.

Therefore, when a power source of the image forming apparatus is turned off or when a network board is removed from the image forming apparatus, namely when the image forming apparatus cannot display the maintenance-use moving image, the present exemplary embodiment enables a worker to view the subsequent part of the maintenance-use moving image. Further, in a case where a maintenance worker carrying a portable terminal moves from the image forming apparatus to a place where the image forming apparatus cannot perform infrared communication with the portable terminal, the present exemplary embodiment enables the worker to view the subsequent part of the maintenance-use moving image on the portable terminal.

In this case, it may be possible for the distribution server 111 to directly distribute the maintenance-use moving image to the portable terminal of the service engineer, instead of distributing it to the operation panel of the image forming apparatus. However, the size of a screen of the portable terminal is limited. Therefore, if the distribution server 111 constantly distributes the moving image to the portable terminal, it may enforce the worker to browse smaller-size moving images during a maintenance work for a long time. The maintenance work becomes difficult.

On the other hand, in the present exemplary embodiment, the distribution server 111 displays maintenance-use moving image on the operation panel of the image forming apparatus in a normal state. If the image forming apparatus cannot display the maintenance-use moving image, or in a case where the worker cannot view the maintenance-use moving image displayed on the image forming apparatus, the distribution server 111 displays the maintenance-use moving image on the portable terminal. Accordingly, the present exemplary embodiment can provide a distribution system capable of displaying the maintenance-use moving image in such a way as to enable the worker to easily view.

Further, when the distribution server 111 is capable of distributing moving images, not only service engineers but also end users can perform a maintenance work for image forming apparatuses. The cost required for dispatched service engineers can be minimized. Further, as the distribution server 111 can distribute moving images in a streaming format, a client (e.g., an image forming apparatus, a portable terminal, etc.) can surely receive maintenance-use moving images even when its hard disk has a smaller capacity.

Moreover, in the present exemplary embodiment, the distribution server 111 determines a distribution destination of a maintenance-use moving image according to a failure generation place of an image forming apparatus and prioritizes the determined distribution destination over other devices in distributing a maintenance-use moving image. Accordingly, for example, a distributed maintenance-use moving image can be surely displayed on the image forming apparatus that has a relatively large display area.

In addition, in the present exemplary embodiment, the distribution server 111 selects a maintenance-use moving image to be distributed according to attribute information (i.e., account) of a worker who performs a maintenance work for an image forming apparatus. Therefore, a maintenance-use moving image suitable for each worker can be displayed. Further, in the present exemplary embodiment, the distribution server 111 distributes a maintenance-use moving image corresponding to a failure selected by a worker of an image forming apparatus or a portable terminal. Namely, the distribution server 111 performs interactive processing with an image forming apparatus or a portable terminal. Therefore, the present exemplary embodiment enables workers to constantly browse optimum maintenance-use moving images.

In the present exemplary embodiment, the distribution server 111 distributes maintenance-use moving images in a case where a failure occurs in an image forming apparatus. As another exemplary embodiment, the distribution server 111 can distribute maintenance-use moving images to an image forming apparatus for a routine maintenance (e.g., inspection) periodically performed regardless of occurrence of failures in the image forming apparatus. In such a case, the image forming apparatus transmits information indicating the necessity of a maintenance work for the image forming apparatus to the distribution server 111.

In the present exemplary embodiment, the distribution server 111 may not always distribute maintenance-use moving images in the streaming format. For example, if an image forming apparatus shifts its operation into a maintenance state, the image forming apparatus can transmit the data of a subsequent part of the maintenance-use moving image to the distribution server 111. Then, the distribution server 111 can transfer the data of the received maintenance-use moving image to a portable terminal. In this case, the distribution server 111 can distribute the rest of the maintenance-use moving image to the portable terminal without detecting a display status of the maintenance-use moving image in the image forming apparatus at the moment when the image forming apparatus has shifted its operation into the maintenance state.

The image forming apparatus described in the present exemplary embodiment can be replaced with any other electronic device that can display maintenance-use moving images and can perform communications with external apparatuses.

A computer that executes a program stored in a RAM or a ROM can realize respective units of the distribution apparatus and respective steps of the distribution method according to the above-described exemplary embodiments of the present invention. The present invention encompasses the above-described program and a computer-readable storage medium that can store the program.

The present invention can be embodied, for example, as a system, an apparatus, a method, a program, or a storage medium. More specifically, the present invention can be applied to a system including a plurality of devices or can be applied to a single device or an independent apparatus.

The present invention encompasses a software program code capable of realizing the functions of the above-described exemplary embodiments (i.e., the program code corresponding to the sequences illustrated in FIGS. 10 to 13 and the flowcharts illustrated in FIGS. 15 and 16 according to the above-described exemplary embodiment) that can be supplied directly, or from a remote place, to a system or an apparatus. The present invention encompasses a computer (or CPU or micro-processing unit (MPU)) in the system or the apparatus that can execute the program code to realize the functions of the above-described exemplary embodiments. A storage medium supplying the program can be selected from any one of a floppy disk, a hard disk, an optical disk, a magneto-optical (MO) disk, a compact disc-ROM (CD-ROM), a CD-recordable (CD-R), a CD-rewritable (CD-RW), a magnetic tape, a nonvolatile memory card, a ROM, and a digital versatile disc (DVD (DVD-ROM, DVD-R)).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-204641 filed Aug. 7, 2008, which is hereby incorporated by reference herein in its entirety.

What is claimed is:

1. A distribution apparatus comprising:
    detection means for detecting a maintenance work required for a device based on failure information received from the device;
    first distribution means for distributing data for a display of information relating to the required maintenance work detected by the detection means to the device;
    determination means for determining whether the device has shifted its operation into a specific state based on received information from the device to which the first distribution means has distributed the data, wherein the received information is different from said received failure information and is information indicating that a display unit of the device cannot provide the display based on the data distributed by the first distribution means for a worker who performs the maintenance work for the device; and
    second distribution means for distributing a subsequent part of the data that follows a part having been displayed, based on the data distributed by the first distribution means, immediately before the device shifts its operation into the specific state, determined by the determination means, to a terminal apparatus of the worker, wherein the terminal apparatus is different form the device to which the first distribution means has distributed the data,
    wherein the distribution of the data by the first distribution means and the subsequent part of the data by the second distribution means is for solving the same failure information received from the device.

2. The distribution apparatus according to claim 1, further comprising:
    selection means for selecting either the device or the terminal apparatus as a distribution destination of the data for the display of the information relating to the maintenance work, based on a place where the maintenance work for the device is to be performed if the detection means detects the maintenance work required for the device,
wherein, if the selection means selects the terminal apparatus as the distribution destination of the data, the first distribution means prioritizes the terminal apparatus over the device in distributing the data.

3. The distribution apparatus according to claim 1, further comprising:
acquisition means for acquiring attribute information of the worker,
wherein the first distribution means distributes data associated with the attribute information acquired by the acquisition means and registered in a database.

4. The distribution apparatus according to claim 1, further comprising:
inquiry means for inquiring either the device or the terminal apparatus about a status of the device,
wherein the second distribution means distributes data corresponding to the status obtained by the inquiry means.

5. The distribution apparatus according to claim 1, wherein the received information is at least one of information indicating a power off state of the device, information indicating removal of a predetermined board from the device, and information indicating disconnection of infrared communication between the device and a terminal apparatus of a worker who performs the maintenance work for the device.

6. A distribution method comprising:
detecting a maintenance work required for a device based on failure information received from the device;
distributing data for a display of information relating to the required maintenance work to the device if the work required for the device is detected;
determining whether the device has shifted its operation into a specific state based on received information from the device that has received the data, wherein the received information is different from said received failure information and is information indicating that a display unit of the device cannot provide the display based on the data distributed for a worker who performs the maintenance work for the device; and
distributing a subsequent part of the data that follows a part having been displayed, based on the data distributed, immediately before the device shifts its operation into the specific state to a terminal apparatus of the worker, wherein the terminal apparatus is different from the device to which the data has been distributed to,
wherein the distribution of the data and the subsequent part of the data is for solving the same failure information received from the device.

7. The distribution method according to claim 6, further comprising:
selecting either the device or the terminal apparatus as a distribution destination of the data for the display of the information relating to the maintenance work, based on a place where the maintenance work for the device is to be performed if the maintenance work required for the device is detected, and
if the terminal apparatus is selected as the distribution destination of the data, instructing distribution of the data by prioritizing the terminal apparatus over the device.

8. The distribution method according to claim 6, further comprising:
acquiring attribute information of the worker, and
instructing distribution of data associated with the acquired attribute information and registered in a database.

9. The distribution method according to claim 6, further comprising:
inquiring either the device or the terminal apparatus about a status of the device, and
instructing distribution of data corresponding to the obtained status.

10. A non-transitory computer readable storage medium storing a control program that causes a computer to execute a distribution method, comprising:
computer-executable instructions for detecting a maintenance work required for a device based on failure information received from the device;
computer-executable instructions for instructing distribution of data for a display of information relating to the required maintenance work to the device if the maintenance work required for the device is detected;
computer-executable instructions for determining whether the device has shifted its operation into a specific state based on received information from the device that has received the data, wherein the received information is different from said received failure information and is information indicating that a display unit of the device cannot provide the display based on the data distributed for a worker who performs the maintenance work for the device; and
computer-executable instructions for distributing a subsequent part of the data that follows a part having been displayed, based on the data distributed, immediately before the device shifts its operation into the specific state to a terminal apparatus of the worker, wherein the terminal apparatus is different from the device to which the data has been distributed to,
wherein the distribution of the data and the subsequent part of the data is for solving the same failure information received from the device.

* * * * *